(12) United States Patent
Brands et al.

(10) Patent No.: US 10,958,645 B2
(45) Date of Patent: *Mar. 23, 2021

(54) AD HOC ONE-TIME PAIRING OF REMOTE DEVICES USING ONLINE AUDIO FINGERPRINTING

(71) Applicant: BARCO N.V., Kortrijk (BE)

(72) Inventors: Johannes Brands, Taipei (TW); Christophe Herreman, Kortrijk (BE)

(73) Assignee: BARCO N.V., Kortrijk (BE)

( * ) Notice: Subject to any disclaimer, the term of this patent is extended or adjusted under 35 U.S.C. 154(b) by 57 days.

This patent is subject to a terminal disclaimer.

(21) Appl. No.: 16/447,034

(22) Filed: Jun. 20, 2019

(65) Prior Publication Data
US 2019/0306164 A1    Oct. 3, 2019

Related U.S. Application Data

(63) Continuation of application No. 15/302,668, filed as application No. PCT/EP2015/057428 on Apr. 7, (Continued)

(51) Int. Cl.
*H04L 29/06* (2006.01)
*H04L 9/32* (2006.01)
(Continued)

(52) U.S. Cl.
CPC ........ *H04L 63/0861* (2013.01); *G10L 19/018* (2013.01); *G10L 25/51* (2013.01);
(Continued)

(58) Field of Classification Search
CPC . H04L 63/0861; H04L 9/0866; H04L 9/3228; H04L 9/3231; H04L 9/3234;
(Continued)

(56) References Cited

U.S. PATENT DOCUMENTS 6,966,035 B1    11/2005  Suess et al.
7,180,475 B2     2/2007  Slobodin et al.
(Continued)

FOREIGN PATENT DOCUMENTS

CN    101938489 A    1/2011
CN    102780706 A    11/2012
(Continued)

OTHER PUBLICATIONS

International Search Report (ISR) dated Aug. 6, 2015, for PCT/EP2015/057528.
(Continued)

*Primary Examiner* — Ghodrat Jamshidi
(74) *Attorney, Agent, or Firm* — Bacon & Thomas, PLLC

(57) ABSTRACT

A system and method for sharing electronic data between participants of a phone conference, such as an online presentation, without a need to exchange passwords to link two devices together for data transfer nor go through a login procedure to access the data resource. To achieve this, the participants use a device or software application that samples the audio of the phone conversation and creates a stream of audio fingerprints. The streams of fingerprints are sent to a matching service on the internet. This matching service finds the fingerprints that correspond to the same conversation among the streams of simultaneous users. Once a match is found with a high enough confidence level, the matching service exchanges identifiers such as public IP addresses and sends those back to the fingerprinting units. When instructed by the user, the units can then proceed to setup a secure data connection.

18 Claims, 19 Drawing Sheets

Related U.S. Application Data 2015, now Pat. No. 10,348,724, which is a continuation-in-part of application No. 14/246,812, filed on Apr. 7, 2014, now Pat. No. 10,074,374.

(51) Int. Cl.
  *H04M 3/56* (2006.01)
  *G10L 19/018* (2013.01)
  *H04W 12/04* (2021.01)
  *H04W 12/06* (2021.01)
  *H04L 9/08* (2006.01)
  *G10L 25/51* (2013.01)

(52) U.S. Cl.
  CPC .......... *H04L 9/0866* (2013.01); *H04L 9/3228* (2013.01); *H04L 9/3231* (2013.01); *H04L 9/3234* (2013.01); *H04L 63/06* (2013.01); *H04L 63/18* (2013.01); *H04M 3/56* (2013.01); *H04W 12/04* (2013.01); *H04W 12/06* (2013.01); *H04L 2209/34* (2013.01); *H04L 2209/76* (2013.01); *H04M 2203/6054* (2013.01); *H04M 2203/6081* (2013.01)

(58) Field of Classification Search
  CPC ..... H04L 63/06; H04L 63/18; H04L 2209/34; H04L 2209/76; G10L 19/018; G10L 25/51; H04M 3/56; H04M 2203/6054; H04M 2203/6081; H04W 12/04; H04W 12/06
  See application file for complete search history.

(56) References Cited

U.S. PATENT DOCUMENTS

| | | | |
|---|---|---|---|
| 7,428,000 B2 | 9/2008 | Cutler et al. | |
| 7,434,166 B2 | 10/2008 | Acharya et al. | |
| 7,672,844 B2 | 3/2010 | Masuda et al. | |
| 8,316,138 B2 | 11/2012 | Chang | |
| 8,375,301 B2 | 2/2013 | Nuyttens et al. | |
| 8,608,318 B2 | 12/2013 | Sugiyama et al. | |
| 8,756,348 B2 | 6/2014 | Beel et al. | |
| 9,491,167 B2* | 11/2016 | Talhami | G06F 21/32 |
| 2002/0058502 A1 | 5/2002 | Stanforth | |
| 2002/0196378 A1 | 12/2002 | Slobodin et al. | |
| 2003/0005324 A1* | 1/2003 | Epstein | G06F 21/10 726/21 |
| 2003/0135740 A1 | 7/2003 | Talmor et al. | |
| 2003/0158960 A1 | 8/2003 | Engberg | |
| 2004/0263636 A1 | 12/2004 | Cutler et al. | |
| 2005/0021849 A1 | 1/2005 | Hipfinger | |
| 2005/0036509 A1 | 2/2005 | Acharya et al. | |
| 2005/0101261 A1 | 5/2005 | Weinzweig | |
| 2005/0136949 A1 | 6/2005 | Barnes | |
| 2005/0254470 A1 | 11/2005 | Yashar | |
| 2006/0031779 A1 | 2/2006 | Theurer et al. | |
| 2006/0041755 A1 | 2/2006 | Pemmaraju | |
| 2006/0095376 A1 | 5/2006 | Mitchell et al. | |
| 2007/0005809 A1 | 1/2007 | Kobayashi et al. | |
| 2007/0033289 A1 | 2/2007 | Nuyttens et al. | |
| 2007/0244970 A1 | 10/2007 | Watanabe et al. | |
| 2008/0076386 A1 | 3/2008 | Khetawat et al. | |
| 2008/0092204 A1 | 4/2008 | Bryce et al. | |
| 2008/0195866 A1 | 8/2008 | Roth et al. | |
| 2009/0046139 A1 | 2/2009 | Cutler et al. | |
| 2009/0076959 A1* | 3/2009 | Devaney | G06Q 20/40 705/44 |
| 2009/0083841 A1* | 3/2009 | Gierach | H04L 63/0861 726/7 |
| 2009/0094515 A1* | 4/2009 | Do | G06F 3/04886 715/273 |
| 2009/0198839 A1 | 8/2009 | Banerjee et al. | |
| 2010/0087139 A1 | 4/2010 | Glass | |
| 2010/0202440 A1* | 8/2010 | Hillis | H04L 63/0861 370/352 |
| 2010/0302130 A1 | 12/2010 | Kikuchi et al. | |
| 2010/0317420 A1 | 12/2010 | Hoffberg | |
| 2011/0115689 A1 | 5/2011 | Sugiyama et al. | |
| 2011/0252440 A1 | 10/2011 | Sridhara et al. | |
| 2012/0084349 A1* | 4/2012 | Lee | G06Q 30/0251 709/203 |
| 2012/0185921 A1 | 7/2012 | Wechsler et al. | |
| 2012/0245722 A1* | 9/2012 | Yamamura | G08C 17/02 700/94 |
| 2012/0331509 A1 | 12/2012 | Laksono | |
| 2013/0050254 A1 | 2/2013 | Tran et al. | |
| 2013/0259211 A1* | 10/2013 | Vlack | G06F 16/683 379/88.01 |
| 2013/0263231 A1 | 10/2013 | Lautenschlager | |
| 2014/0073333 A1 | 3/2014 | Keller | |
| 2014/0143889 A1 | 5/2014 | Ginter | |
| 2014/0161263 A1* | 6/2014 | Koishida | G06F 16/683 381/56 |
| 2014/0177571 A1 | 6/2014 | Skolicki | |
| 2015/0254683 A1 | 9/2015 | Haberman | |
| 2016/0275952 A1* | 9/2016 | Kashtan | H04M 3/569 |
| 2017/0177571 A1* | 6/2017 | Skolicki | G06F 16/24578 |

FOREIGN PATENT DOCUMENTS

| | | |
|---|---|---|
| CN | 102801721 A | 11/2012 |
| EP | 1187480 A1 | 3/2002 |
| EP | 1246395 A1 | 10/2002 |
| WO | 0052887 A1 | 9/2000 |
| WO | 2009059518 A1 | 5/2009 |
| WO | 2013/138651 A1 | 9/2013 |

OTHER PUBLICATIONS

Written Opinion dated Aug. 6, 2015, for PCT/EP2015/057528.
Search Report of GB 1206841.7, dated Aug. 28, 2012.
International Search Report (ISR) of PCT/EP2012/068166, dated Mar. 6, 2013.
International Search Report (ISR) of PCT/EP2012/068167, dated Mar. 19, 2013.
International Search Report (ISR) of PCT/EP2012/068168, dated Mar. 4, 2013.
International Search Report (ISR) of PCT/EP2012/068169, dated Jan. 28, 2013.
Proc. 3rd International Conference on Ubiquitous Intelligence and Computing, Sep. 2006, Wuhan, Springer-Verlag, Germany, pp. 688-697, Wenbing Jiang, et al.; "Free speech: a novel wireless approach for conference projecting and cooperating".
Chinese Search Report in related Chinese Application No. 201580018980.0, dated Oct. 17, 2018.
European Office Action in corresponding European Application No. 15717445.9-1213, dated May 3, 2019.
Office Action dated Sep. 30, 2016, for corresponding U.S. Appl. No. 14/246,812.
Office Action dated Jan. 8, 2018, for corresponding U.S. Appl. No. 14/246,812.
Office Action dated Jun. 16, 2017, for corresponding U.S. Appl. No. 14/246,812.
Sigg et al., "AdhocPairing: Spontaneous audio based secure device pairing for Android mobile devices," Fourth International Workshop on Security and Privacy in Spontaneous Interaction and Mobile Phone Use (IWSSI/SPMU) Jun. 18, 2012, Newcastle, UK.
Office Action dated Dec. 30, 2016, for corresponding U.S. Appl. No. 14/246,812.
Chinese Office Action in corresponding Chinese Application No. 201580018980.0, dated Jul. 25, 2019.
Chinese Office Action in corresponding Chinese Application No. 201580018980.0, dated Oct. 22, 2019.

* cited by examiner

AD HOC ONE-TIME PAIRING OF REMOTE DEVICES USING ONLINE AUDIO FINGERPRINTING

The present invention relates to methods, systems and devices for pairing and authorising devices for real-time collaboration applications as well as software for implementing such methods or systems. In particular the present invention relates to a communication between devices supporting voice transmissions and to authentication of an additional electronic data communication.

BACKGROUND

When two or more persons having a phone conference, want to share electronic data or media content with possibly confidential or private information, such as a document, a picture, or a presentation, they need to setup an additional communication channel. This is typically done over a computer data network.

The setup of such a secure communication channel over an insecure computer data network is cumbersome and vulnerable to attacks. There are two problems to be solved: (a) how do the endpoints find each other on the network? This is connectivity issue. And (b) how can it be really known that the connection is genuine and not an impersonator? This is an authentication problem.

The connectivity issue can be solved by using conventional peer-to-peer or client-server connection setup techniques. The authentication issue is more difficult to solve.

Encryption protocols include an authenticated key exchange phase and it is this first step that is the most vulnerable and also the most annoying.

Authenticated key exchange depends either on a shared secret or on a trusted third party such as a public certification authority. But using a trusted third party still requires an authentication phase: one has to prove his identity via login and passwords, so this doesn't help.

Relying on a pre-shared secret is also unsuitable, because it requires a special exchange step prior to the phone conversation. This is unsuitable for ad-hoc communications between people who may never have met.

Any system requiring passwords or pre-shared secrets is vulnerable to attacks. Secrets and passwords can be stolen or lost and certificates can be forged.

A common secret could be generated ad hoc and can be communicated over the phone, but this process is again not user friendly. It's annoying and intrusive. The secret could be exchanged via another out-of-band channel such as email or fax. However, this method has the same problems as above and also requires the participants to make additional steps, such as opening email clients, communicating email addresses, etc. In addition, these methods are susceptible to eavesdropping. Telephone connections or email messages are insecure ways of communication that are easily compromised.

Several methods have been devised to generate an ad hoc secret and communicate this over the phone to the participants. Some methods use watermarking techniques to hide the secret in an audible signal. However, phone connections are not well suited to robustly transmit metadata, without being very intrusive and hinder the normal conversation. The secret also needs to be repeated to late-comers. And a login procedure prior or during the call is still required to protect against eavesdropping, with again the same problems regarding ease of use and security.

The fundamental problem of all automatic authentication methods is that they use keys or passwords that are in no way related to the way that human beings use to identify and authenticate each other. So, setting up an additional electronic communication channel, naturally requires another secret password, at some stage or another, for authentication.

The problem thus is finding a way to extend this robust manual authentication method to the second, electronic communication channel, in an ad-hoc, transparent and robust way.

WO 2013/138651 describes a method to allow authorization of computing device association using human-perceptible signals. The method includes forming an association between a first computing device and a second computing device, computing with the first computing device a fingerprint of a common key derived during forming of the association, and emitting with the first computing device a first audio stimulus based upon the computed fingerprint. The first audio stimuli is at least one octave number apart from a second audio stimuli of the second computing device emitted by the second computing device based upon the common key. Accordingly the first computing device is configured to emit human perceptible sounds, i.e. to emit a first audio stimulus based upon the computed fingerprint. A second audio stimulus is emitted by the second computing device based on the common key. If a simultaneous playback of both sequences is harmonious, the common key was exchanged, if it is discordant the devices failed to exchange a common key.

US 2003/0135740 describes a network based mechanism for real time verification and authentication of data and user identities. Biometric elements, such as voice prints, are utilized to enhance the Public Key Infrastructure as a means to decrypt data and verify data authenticity, such that the user's private key is authenticated remotely on a one-time basis. An authentication server has various software modules that enable authentication of user identity, secure user access to data, digital signatures, secure messaging and secure online transactions.

SUMMARY OF THE INVENTION

An object of the present invention is to provide alternative methods, systems and devices for pairing and authorizing devices for real-time collaboration applications as well as software for implementing such methods or systems. In particular it is an object of the present invention to provide methods and systems for automatic and ad-hoc discovery of devices that are used by two or more participants of a phone conference, and for one-time and ad-hoc authorization of electronic data connections between those devices.

Embodiments of the present invention provide automated pairing between participants of a phone conference and their devices, and also between the remote devices mutually, without the manual exchange of identifiers or addresses, and provide a human-assisted authorization of data channels, especially authorization of additional data channels parallel to existing voice channels, without the use of keys or passwords.

Embodiments of the present invention makes use of the fact that when people are calling each other in a voice communication over a network such as in a phone conference, they already identify and authenticate one another, by using normal verbal language.

Compared to known automated, electronic authentication, embodiments of the present invention make use of the fact that human beings are more flexible and highly skilled in detecting deceit. People are capable of assessing any type of situation, whether it is part of their daily routine or whether it is very exceptional. People intuitively know how much trust is appropriate in any type of situation. Embodiments of the present invention provide methods, systems and devices that build on the trust created in a voice communication between participants.

Embodiments of the present invention use an ad hoc audio environment for creating the fingerprints and to obtain a match between two different locations and to set up data transfer. Hence there is no need to generate a key beforehand for the matching step. The key is determined only when establishing connection between the devices. No user intervention is needed to transmit certain types of information to create an ad-hoc key for the matching step. There is no need to transmit a certain type of audio signal e.g. a special melody or a predefined sentence for the machine identification phase and for the human assisted authorization. In particular, the participants do not need to key-in identifiers, such as email addresses, to enable the pairing of their devices, nor do they need to key-in credentials to authorize the devices that act on their behalf.

The system and method of embodiments of the present invention are adapted to give output to the user to inform the user of a the progress of the matching process and of a positive match and optionally for the methods or systems to support receipt of an input from human user to confirm the authorization of the setup of data communication channels. In accordance with embodiments of the present invention the end devices can be and usually are not the vicinity of each other. Embodiments of the present invention are adapted to allow an input of a human action to complete an assisted authorization phase.

Accordingly the present invention in one aspect provides a method or system for automatic one-time ad-hoc setup of data channels in parallel to an existing voice communication between first and second user equipments of first and second users, respectively, the data channel being adapted for exchanging electronic data, the method comprising:
creating first and second fingerprints of ad-hoc real-time audio signals exchanged between the two or more users and available at the first and second user equipments, respectively;
comparing the first and second fingerprints in accordance with a matching algorithm, and if the comparing meets a requirement of matching similarity, receiving a user action authorising the data channel across a data network.

The present invention does not exclude the use of secret keys to set up other parts of the complete transaction.

In accordance with embodiments of the present invention a different network and devices can be used for pairing and for exchanging the information, respectively.

In accordance with embodiments of the present invention, two or more remote participants in a live, bi-directional audio communication e.g. conversation such as in a phone call, a phone conference or a video conference can make use of a system, or method to setup a secure communication channel and exchange confidential information by using audio signature matching, such with audio fingerprinting units that are fed the audio signal of the conversation from each participant. The fingerprint units each create audio fingerprints of the normal conversation in real time and send these fingerprints to a central matching service on a computer network, typically via the internet. The matching service finds pairs and groups of matching fingerprints among all incoming fingerprints from all users of fingerprinting units over regions of the world or over the world.

When such a group of matching fingerprints is found with a high enough confidence level, the matching service sends the participants of that group the data needed to uniquely identify one another on that same data network (or optionally another one). Along with these unique identifiers the service also can include a randomly generated shared secret, which can be used to start conventional cryptographic key-exchange protocols. Other metadata may be provided such as GPS location data of the other participant or participants as a location may also give some idea of the veracity of the other parties.

As such, the user, e.g. the fingerprint unit of each participant now has (a) the identities of the units of each correspondent needed to find and connect one another on the data network, with (b) the assurance that only the participants that he converses with on the phone can receive this identity and vice versa, and (c) a common secret to start conventional encryption protocols.

When the fingerprinting units receive such identification(s), the user is informed by a message on the screen, or by a tactile signal, an audible signal or any combination of these. It is then up to the user to decide whether he authenticates his correspondents and authorizes the exchange of data and that sufficient trust exists in the other correspondents on the phone and whether sharing of data with them is accepted. In such a case the user can start sharing content by a user action such as a simple push of a button, or with a mouse or key action and without any further assistance of the matching service.

In addition, and optionally, by using the time shifts that appear in matching pairs of streams of fingerprints (see FIG. 5), the matching service can detect where the sound was coming from, because at any one time some of matching series of fingerprints will appear to happen earlier in the fingerprint coming from the speaker's unit, because that sound hasn't been traveling through the telephone network. By comparing the timings of a series of matching fingerprints and tracking the time shifts in them, the matching service can detect which participant is speaking at what time, and thus the matching service can distinguish silent participants (and potential eavesdroppers) from regular participants.

Optionally, other types of metadata can be used such as the phone number of the phone, or the IMSI of a cellular phone or the correspondent can be queried or challenged by the fingerprinting unit. In such a case, these metadata such as numbers or alphanumeric sequences can be used to provide a hint to the matching algorithm. This is a trade-off of speed of matching and errors as such procedures might lead to false positive matches, because the numbers do not always identify the participants uniquely. In a phone conference, this is not the case. In addition, querying the phone number is per today only possible with certain smartphone operating systems.

This method is very robust by using the voice conversation itself to obtain a one-time authentication, e.g. to use a cryptographic function such as a one-way-function (of which a hash is one example) to obtain a session key derived from the voice conversations. For example, after obtaining a hash key from the voice conversations and calculating the match with the hash keys of all other conversations being made, there is a strong bond between the participants and their respective fingerprinting units. What the human uses to recognize, understand and ultimately authenticate suitable correspondents during a phone call is automated in the sense that the match is obtained in an unobtrusive way using identifiers which are exchanged by the matching service.

The strong bond is made online, in real-time and ad hoc and there is no password or key to steal or to loose. Voice can be used as a biometric characteristic however usually such a voice identifier is stored in advance and used to identify the person. No such pre-storing of voice prints needs to be made with the methods, systems and devices of embodiments of the present invention. The authentication can be one-time only and all connections can be torn down after completion. This means that all permissions or privileges that have been created in an ad hoc way are removed after completion. There are no registered users such as occurs with Skype. Hence no perpetual rights are left which could result in a lack of security.

Advantages of the methods, systems and devices of embodiments of the present can be one or more of the following:

(a) The one-time authentication key such as a hash-key based on one or a series of fingerprints from a single fingerprinting unit, is absolutely unique. The matching service will not decide that a pair of keys belongs to the same conversation if it detects an ambiguity among the many thousands of keys. And since all fingerprints are exhaustively compared with each other, all ambiguities can be detected. Even fingerprints that come from units of people that are actually talking to each other, do not match perfectly one to one. There are very specific differences between them that are so characteristic that they can be used in any of the embodiments of the present invention in the matching process. They can be used in any of the embodiments of the present invention to distinguish a genuine participant from a non-genuine one such as an eavesdropper or an attacker.

(b) The one-time authentication match is consistent: one-time authentication keys according to embodiments of the present invention such as fingerprint keys from units of people that are actually talking to each other on the phone, show a consistent mirror image. This mirror image comes from the fact that the paths of the audio signals are different: the one audio signal travels either directly to the fingerprinting unit, or in case the other correspondent is talking, the signal first needs to travel through the phone network first, before it can finger-printed. Since this transmission through the phone network has a specific delay, it shows as mirrored delays that can be detected and these can be used in any of the embodiments of the present invention to detect matches. See FIG. 5.

(c) Because of (a) and (b), methods of embodiments of the present invention establish a pairing between the fingerprinting units and as a consequence also a strong—authenticated—pairing between the remote device carrying the fingerprinting unit, and the remote participant on the phone.

(d) Risk of human error on the part of the participants is reduced, because of the fact that the method is an easy, straightforward and online method. The secure connection is setup only after the participants have all carried out a deliberate user action to accept the data transmission, e.g. pushed a button or made a mouse click. This command is given at the time of the phone call e.g. during the phone call itself, it is not done in a prior step. Because of that strong link between phone conversation and the action to share the confident data the risk that someone would share data by mistake is reduced. This provides an advantage over other methods where machine made authentication is separated from the phone conversation, where one can send a message to the wrong person.

(e) The risk of a man-in-the middle attacker is reduced. The phone network and the data network are vulnerable to attack and are difficult to protect. But because of the real-time nature of the phone conversation, it is very difficult for the attacker to impersonate the genuine participants and place himself in between the participants of the phone call. In addition, the attacker also needs to hack into the data network and place himself in between the fingerprinting units and the matching service, in order for the attack to succeed. Breaking in both connections at the same time, and successfully placing him between two participants of a real-time phone conversation might be theoretically possible; it is in practice very difficult. The participants may also easily detect the additional delay on the phone, in case of such an attack. As such, methods, systems and devices according to embodiments of the present invention are robust to a man-in-the-middle attack.

(f) The matching service and either one of the fingerprinting units could be compromised, but, in contrast to the network itself, these endpoints are much easier to protect.

A method according to the present invention can be non-intrusive, because there is no need for a special artificial sound being used on the phone network. It is also easy to use, because there are no passwords to enter and no manual key-generators to use. And it is robust to man-in-the-middle and other attacks, because the audio conversation itself is used as the key to match out each other and the attacker would need to place himself in between the participants in both the real-time phone conversation and the data connections to the matching service.

The matching service on a data network such as the internet, can have an anonymizing function or device such as an anonymizing proxy in front of it. In addition, the matching service on the data network such as the internet, or the anonymizing proxy in front of it, can play a role of a relay in conventional NAT (Network Address Translation) and PAT (Port Address Translation) traversing protocols.

A method according to the present invention preferably supports ad hoc situations. The phone is the most common denominator among all telecommunication tools. Not everyone uses the same communication clients, but a very large percentage of the world's population has access to a phone.

With any of the embodiments it is possible to extend a strong pairing step as described above between the fingerprinting unit and the participant to other sharing applications, for example, even when these are installed on other devices. A participant may have a number of devices: a mobile phone, a laptop, a tablet etc. And on each of these devices, the participant may install one or more sharing applications, e.g. applications that are capable of sharing electronic content with remote users. If this remote participant is now authenticated by a human being, and he/she activates and starts using one of these sharing applications, during a live phone call, then the pairing bond between the remote participant and his/her application suddenly becomes much stronger.

Methods according to the present invention can combine the highly flexible social skills of human beings, with ease of use of automation: The actual authentication of the remote participant is done by his human correspondent. And the amount of the trust he or she intuitively has in his or her correspondent, whatever that amount may be, can be extended to the application that the remote participant is using at that specific moment.

DETAILED DESCRIPTION OF THE INVENTION

A) Definitions

Figure 1:
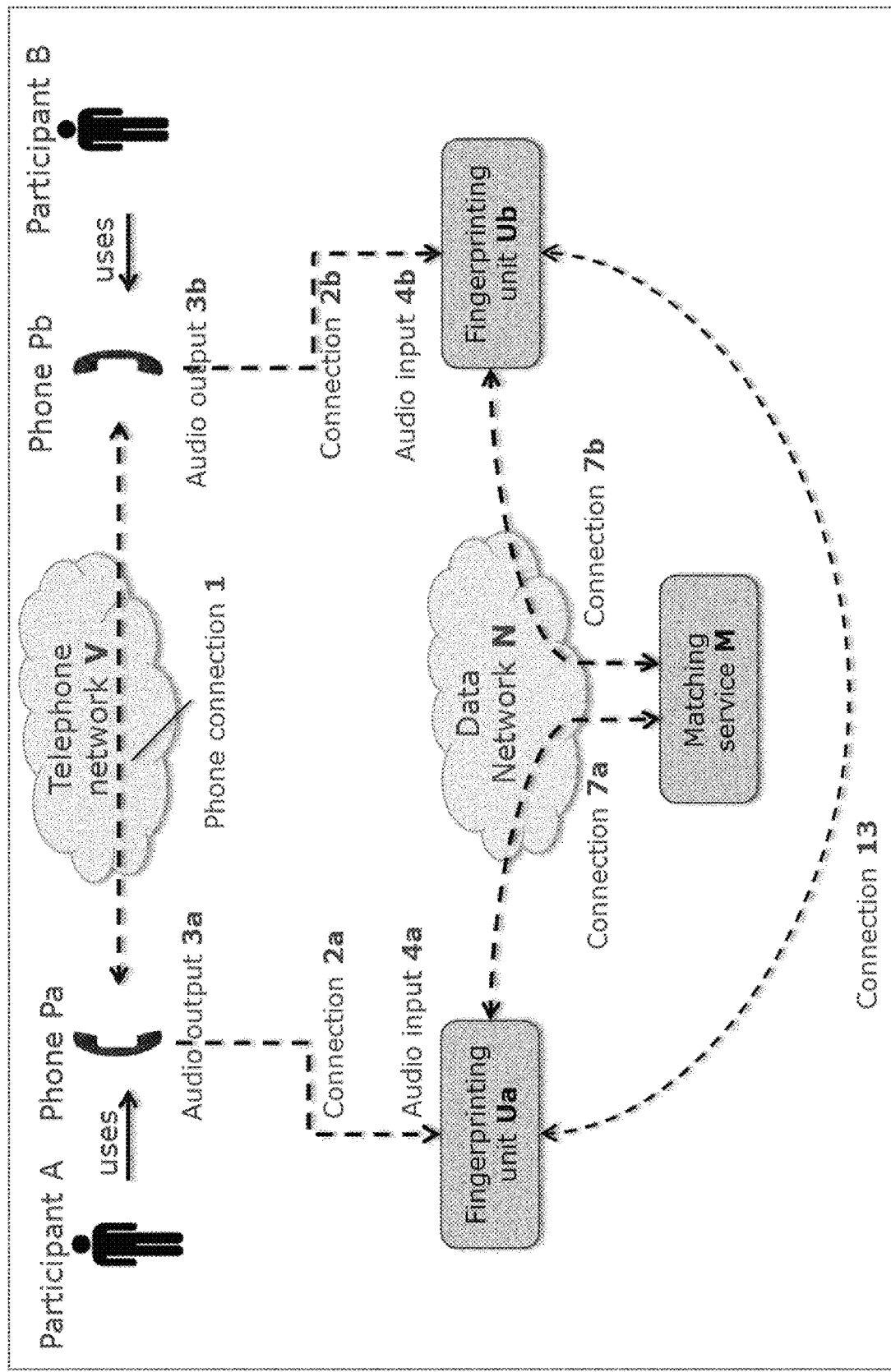
FIG. 1 is a schematic representation of how a sharing of electronic data is set up according to an embodiment of the present invention including fingerprinting units with embedded sharing functionality, which are capable of setting up a peer-to-peer connection to share electronic content.

For the sake of clarity and completeness, we make the following definitions that are used throughout this document:

(Def A) A 'phone': (Pa, Pb) is any kind of telecommunication function or device or software application supporting a human voice audio connection with users that are not in the same vicinity so that audio signals can be heard directly by the users. It can be a conventional plain old telephone, or an IP (internet protocol) phone, or a mobile phone, or any device or system to make phone or video conference calls, or any software application that captures the audio from a microphone, samples it, converts it to a signal, and transmits that signal over a telecommunication network. The phone may be a conventional phone as used for many decades to support voice communication over a network, the phone comprising a transmitter and receiver of human voice audio signals travelling over the network as well as a microphone and loud speaker. The phone may however also include a user interface, a memory in which command instructions are stored and a processor operably connected to the transmitter, receiver, user interface, and memory, and configured to execute command instructions. The processor may be adapted to compute a fingerprint of voice communications transmitted and/or received by the phone or this may be done by an additional device.

(Def B) A "phone network" or "telephone network" is any kind of telecommunication network which supports a voice connection with users that are not in the same vicinity so that they can be heard directly. It can be a POTS, or an IP or TCP/IP network, or cellular phone network, public mobile radio network any network that supports human voice communication such as a phone or video conference network, or any network that has devices which capture the human voice audio signals from a microphone, sample it, convert it to a signal, and transmit that signal over a telecommunication network.

(Def C) The phones and other human voice communicating devices can use any kind of "telecommunication network" (V) to connect to each other. A telecommunication network can usually provide more services than just supporting human voice messages. This network can be a traditional PSTN network, or a wired or wireless data network (using for instance Voice over IP), or a cellular phone network or a chain of any combination of those. The network can also contain any kind of data communication mechanism in which an audio signal is transmitted.

(Def D) A "data network" (N) is any network that supports transmission of electronic data such a documents, drawings, video, images etc. In many cases, the telephone network (V) and data network use the same physical infrastructure. These networks are typically IP based (internet protocol), but this is not required. The telecommunication network typically transports various types of signals and supports various types of services.

(Def E) An 'over-the-air connection' (1) is a human voice audio connection in which the transmission of the audio signal is sent via an audio speaker and received by a microphone.

(Def F) Participants: The persons that wish to exchange data. (A, B, . . . )

(Def G) Attackers: persons or devices or software applications that try to listen in (eavesdropping) on the phone conversation or discover the plaintext (unencrypted data), without the knowledge or intention of the participants. Also included in this group are persons or devices or software applications that do not have the intention of eavesdropping or discovering the plaintext, but do can so by accident and without the consent of the genuine participants.

(Def H) A "fingerprinting unit" (Ua, Ub) is a device, function or software application or web application that is used to capture the human voice audio, sample and create from it a unique digest or "fingerprint" and send it to the matching service (M) for example via an anonymizing proxy (P). The fingerprinting unit has computing and communication capabilities, i.e. it can include a processing engine such as a microprocessor and/or Field gate array (e.g. an FPGA). This unit can be an embodied as an "app" running on a smartphone, an application installed on a computer, or embedded in a device available to one participant such as a remote participant or installed in to meeting room, or embedded in a phone or video conferencing system. The unit can also be embodied as an application running on a server in the corporate network where it has access to a connection to a PBX or to voice-over-IP streams (1) of the IP phones. Or, the unit can also be embodied as a web application that is hosted on a web server. In the case of a web application the unit does not need to be pre-installed, and a URL to the web page can be shared safely among the participants via email. In other cases the unit is pre-installed.

(Def I) The "hamming distance" is a measure of similarity or dissimilarity between two digital entities such as fingerprints for example the number of bit positions at which the corresponding fingerprints are different.

(Def J) A 'matching algorithm' is an algorithm that the matching service (M) uses to compare fingerprints and to calculate their similarity or dissimilarity, e.g. their hamming distance.

(Def K) A 'positive match' refers to a state where the matching service (M) decides that a group of two or more matching fingerprints belong to the same phone conversation.

(Def L) An 'identification-message' (Ia, Ib) is a message containing meta data that can be used to identify a participants. The content of such a message can be, for example the name of the participant or the public IP address of a fingerprinting unit. This message can contain a secret session key that can be used to start off the key exchange phase of traditional cryptographic protocols. The message can also contain an indication of the sharing capabilities of the participant. These capabilities can describe, for example what sharing tools are installed, what network protocols are supported and how the tools can be reached on the data network (N). A list of possible in the identification messages (Ia, Ib)

A user id token structure of the participant of the phone call
  Optionally with authorization schemas of access granting protocol(s) and the authorization keys that grant access to networked resources.
Such token may include any one or combination of the following attributes:
  The name of the participant.
  A picture of the person, and/or an avatar.
  One or more email addresses.
  An identity provider
  The URL or URI of online resources, such as for instance a web page, including a domain nameµ
  A more specific case of such a token: An OpenID connect ID token
One or more device id tokens, identifying devices that the participant uses, such a token may include any one or combination of the following attributes:
  A network address, such as a public IP address and optionally a port number
  An HTTP tracking cookie.
  The URL or URI of online resources, such as for instance a web page, including a domain name
  An SSID of a wireless local area network (WLAN), where the device can be reached.
  A phone number, and/or an IMSI number,
  a GPS location of the device (Def M) The 'identification encryption key' (Ka, Kb, Kp) is an encryption session key preferably a random encryption session key that is generated by the units (Ua, Ub) or the proxy (Kp) and used to encrypt the identification message(s) (Ia, Ib).

(Def N) A 'phone call': (Pa, Pb) is to be interpreted broadly and is to include any kind of telecommunication function or software application that supports a human voice audio connection with users that are not in the same vicinity so that audio signals can be heard directly by the users. It can be set up by a call procedure as in a conventional POTS system, or a Voice over IP (internet protocol) voice communication, or a cellular mobile call, or any phone or video conference calls, or any voice communication using a software application that captures the audio from a microphone, samples it, converts it to a signal, and transmits that signal over a telecommunication network.

B) The Architecture

The following section describes components and how they are connected for use in methods, systems and devices to be used with any of the embodiments of the present invention:

1) All participants (A, B, . . . ) to the phone conversation (1) use an audio fingerprinting unit (Ua, Ub). People that are sitting in close proximity of each other, such as round the meeting room table can use the same unit or individual units. Embodiments of the present invention relate to voice and data exchanges over networks at such a distance that normal voice conversation is not possible without such long distance telecommunication devices and networks.

Figure 2:
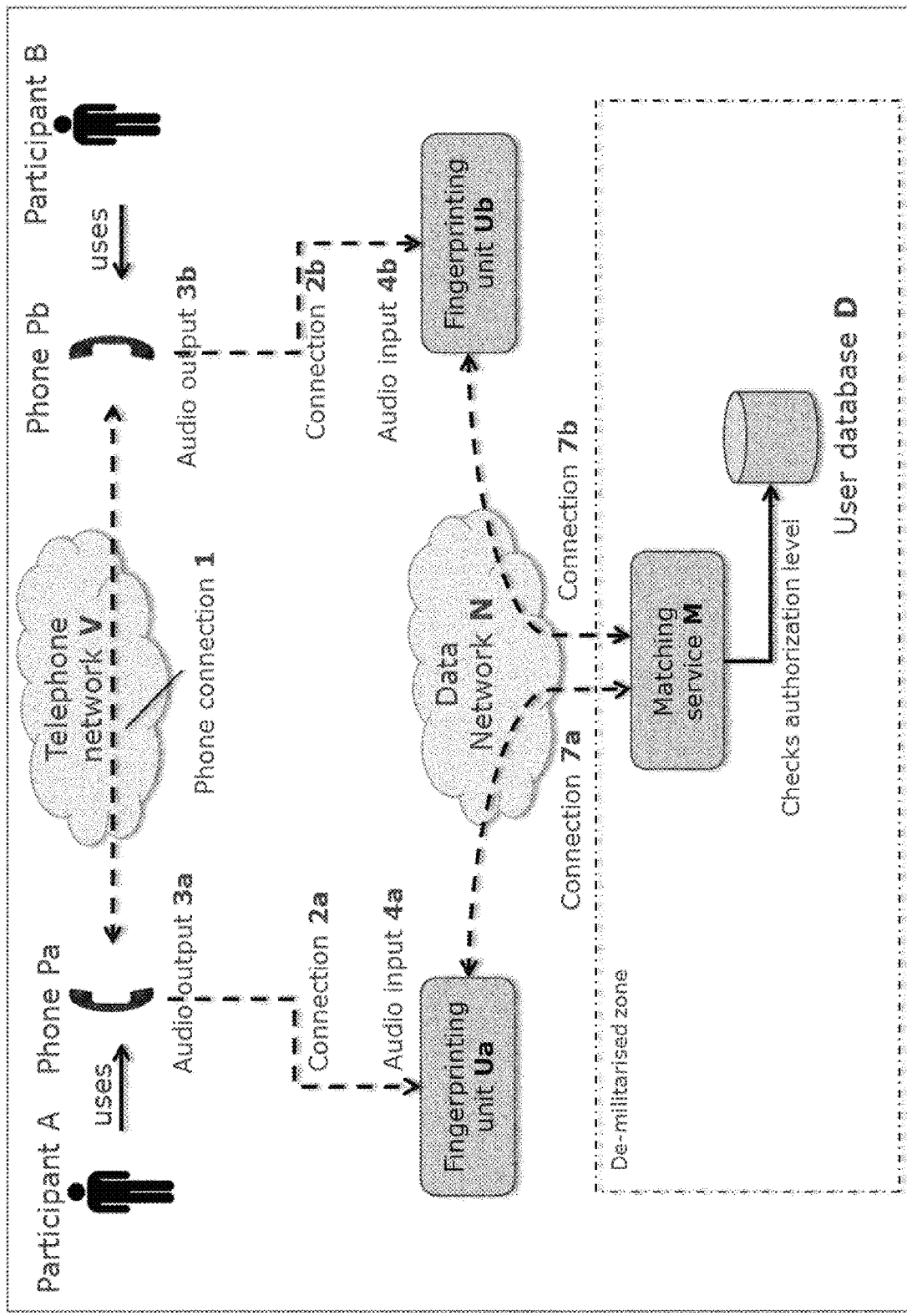
FIG. 2 is a schematic representation of a system for matching fingerprints according to an embodiment of the present invention.
Figure 3:
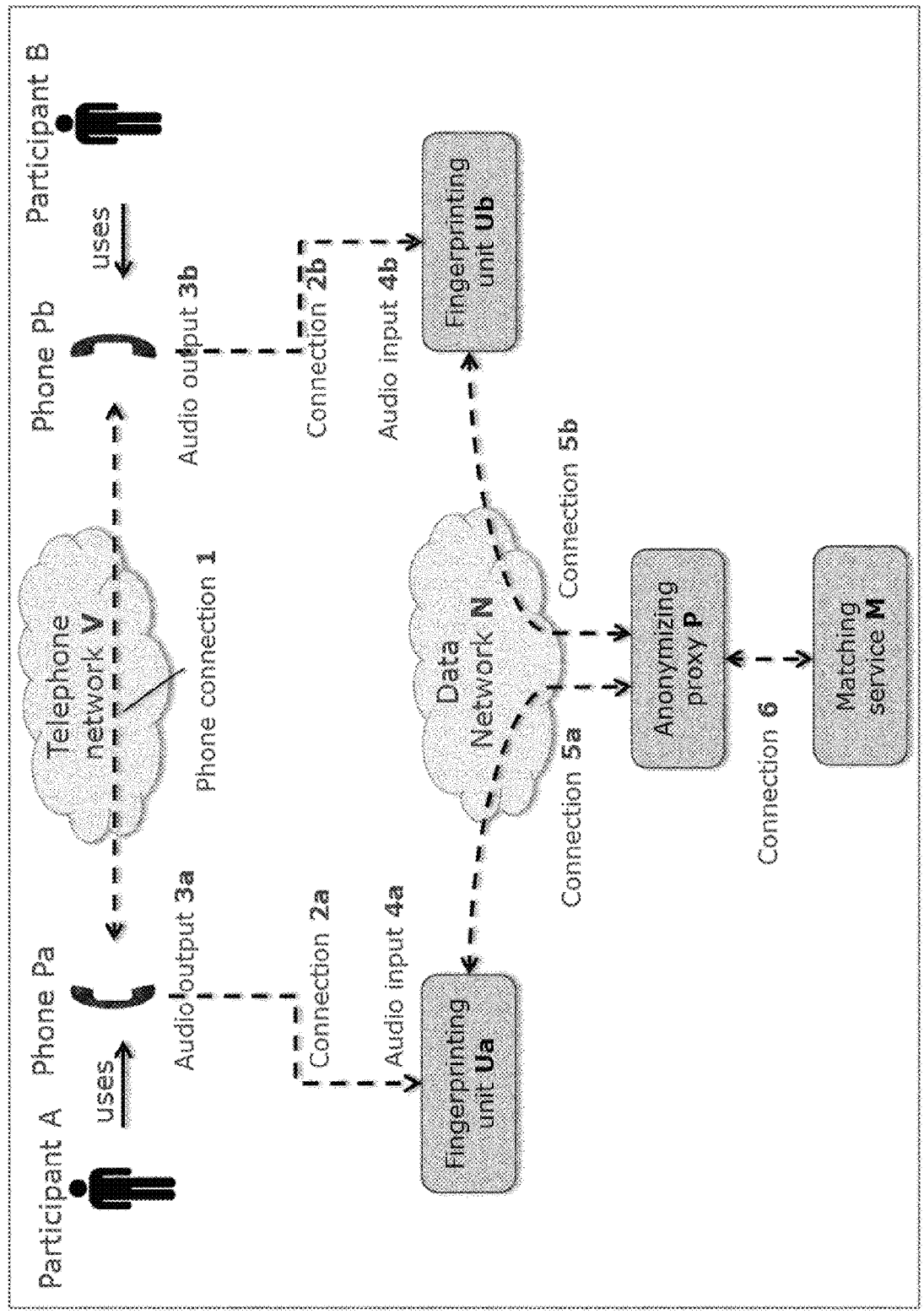
FIG. 3 is a schematic representation of a system for matching fingerprints according to an embodiment of the present invention using a anonymizing proxy.
Figure 4:
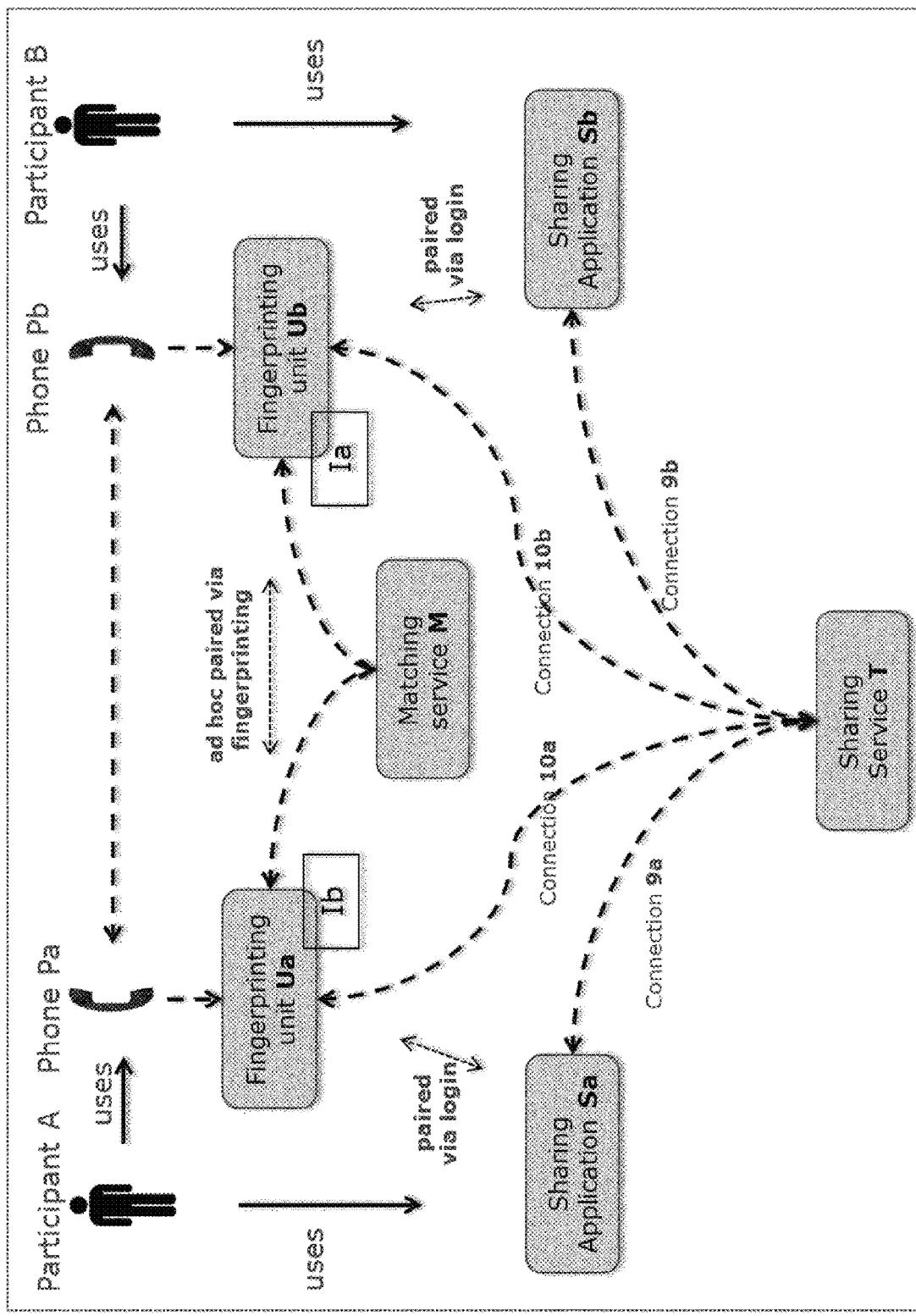
FIG. 4 is a schematic representation of a system for sharing of electronic data according to an embodiment of the present invention.

2) FIGS. 2 to 4 show systems according to embodiments of the present invention having voice communication devices such as phones (Pa, Pb), a network capable of supporting vice communication such as a telephone network (V). Components with the same reference numbers refer to elements with the same function in each figure unless something else is defined below. The voice communication devices such as phones (Pa, Pb) generate an audio signal of the phone conversation, i.e. the voice signals generated by microphones in the handsets (Pa, Pb) of the phones as well as the audio emissions of the loudspeakers in the headsets of the phones (Pa, Pb). These audio signals may be captured within the handsets or such audio signals may be captured via a handsfree device or similar. The captured audio voice signals can be fed from audio outputs (3a, 3b FIG. 2 or 3) of the phones (Pa, Pb) into audio inputs (4a, 4b FIGS. 2 and 3) of fingerprinting units (Ua, Ub) respectively. This can be done via any suitable connection such as a cable connection (2a, 2b) between audio outputs (3a,3b) of the phones (Pa, Pb) and the audio inputs (4a, 4b) of the fingerprinting units (Ua, Ub), or, it can be a software connection (2a, 2b) inside the voice communication devices such as smartphones or personal computers adapted for voice communications, e.g. VoIP, of the participants (A, B). In case the fingerprinting units (Ua, Ub) are running on a server in a data network such as a company or corporate network, a connection (2a, 2b) can be made across such a network via conventional network protocols. A connection (2a, 2b) can also be an 'over-the-air connection'. In the latter case the fingerprinting units (Ua, Ub) can receive signals from microphones (4a, 4b) to listen to the speaker(s) (3a, 3b) and the voice of the participant (A,B).

3) Human voice communication devices such as phones (Pa, Pb) can be any of the devices disclosed in DefA above. The network used by the phones (Pa, Pb) can be any kind of telephone network (V) in definition DefB above. The fingerprint units (Ua, Ub) can be any such unit disclosed in DefH above.

4) To pair voice communications that travel across a network V a matching service (M) is provided, e.g. on a network N. A matching service (M) can be implemented in any suitable way to execute a matching algorithm as disclosed in DefJ above. For example, the matching service can be provided as a software application running on any suitable processing device such as a server device. The matching service (M) receives and matches the fingerprints. The matching service can be provided on a network (N) which can be any data network disclosed in DefD above. The matching service (M) may be implemented on a processing device having a user interface, a memory in which command instructions are stored and a processor operably connected to a transmitter and a receiver of a network interface (for receiving and transmitting signals on network), the user interface and the memory, and configured to execute command instructions related to the matching algorithm and the receipt of signals to be matched over a connection (5a, 5b, 7A, 7b FIG. 2 or 3) as well as the transmission of signals over connections (5a, 5b, 7a, 7b FIG. 2 or 3) confirming a match. The processor is adapted to compare fingerprints of voice communications received.

5) In order to find positive matches, the various fingerprinting units (Ua, Ub, . . . ) involved in the voice communications use a common matching service (M). See FIGS. 2 and 3. If the service is deployed on a wide area data network such as the internet, or a satellite network the service works with participants residing in different countries or in different continents. In such as case, one or more anonymizing proxies (P FIG. 3) can be used, deployed in different regions to serve the users (A, B) from these regions. The proxy may be a Virtual Private Network (VPN) anonymizing proxy (P). An anonymizing proxy (P) may be a processing device having a memory in which command instructions are stored and a processor operably connected to a transmitter and a receiver of a network interface (for receiving and transmitting signals on the network over connections 5a, 5b; 6 FIG. 3) and the memory, and configured to execute command instructions related to anonymizing. Where an anonymizing proxy (P) is not used the matching service (M) can also be instructed to verify whether the users have the required level of authorization to participate or to access a confidential resource. This may be done by querying a user database (D) in which such levels of authorizations per used are stored—see FIG. 2.

6) A company or an organization can host its own version of the matching service (M). See FIG. 2. Such a service can then be setup inside the corporate network, or in the DMZ (de-militarized zone) of the corporate network. This can be suitable for applications where one needs to restrict access to confidential data to authorized users only. In such a case, no anonymizing proxy (P) needs to be used.

7) The communication protocols used to transmit the messages over the connections (5a, 5b, 6, 7a and 7b, 9a, 9b, 10a, 10b, FIGS. 2 to 4) are preferably secure such as by HTTPS (secure HTTP), or secure web-socket, or any other (proprietary or standard) protocol that enables to transmit the fingerprints and accept the messages back.

8) With reference to FIGS. 1 and 4, a sharing application (Sa, Sb) can be provided to execute sharing of confidential information, e.g. electronic data between the participants. This sharing application (Sa, Sb) can be added to the networks (V,N) and components such as phones, fingerprint units, matching service, user database, or anonymizing proxy (Pa, Pb, Ua, Ub, M, D, P) and connections (2a, 2b, 5a, 5b, 6, 7a, 7b) and outputs (3a, 3b) and inputs (4a, 4b) of FIGS. 2 and 3. Optionally, this sharing application (Sa, Sb) can be connected to a sharing service (T) to receive identification messages (Ia, Ib) from the fingerprinting units (Ua, Ub) and to exchange sharing capabilities—see FIGS. 1 and 4. Identification messages are as defined in DefL. The sharing service (T) may be implemented on a processing device having a user interface, a memory in which command instructions are stored and a processor operably connected to a transmitter and a receiver of a network interface (for receiving and transmitting signals on network), the user interface and the memory, and configured to execute command instructions related to the sharing of electronic data between participants, the receipt of signals to be matched over a connection (9a, 9b, 10A, 10b FIG. 1 or 4) as well as the transmission of signals over connections (9a, 9b, 10a, 10b FIG. 1 or 4) which can be protected by cryptographic protocols.

9) A sharing application has communication and visualization capabilities and optionally also capabilities to grab electronic data content, such as frame grabbers or screen scrapers, from data processors (not shown in FIG. 4) such as laptops, PDA's, smartphones, computers, workstations etc. A sharing application can be embedded in a fingerprinting unit itself or it can be embodied as a separate software application or separate processing device placed outside the fingerprinting unit. The connections (10a, 10b) between the sharing service (T) and the fingerprinting units (Ua, Ub) are preferably secured by a cryptographic protocol. A participant may have several sharing applications installed on the data processor (not shown in FIG. 4) such as a laptop, a PDA, a smartphone, a computer, a workstation etc. The sharing application is preferably developed for a specific purpose. For example, an application can be provided to view and share medical imagery, with special features to calibrate the screen of the data processing device. Other examples are a more generic file sharing and viewing application, or a video conference system, or simply a chat application.

C) The Workflow of a Matching Process

Figure 16:
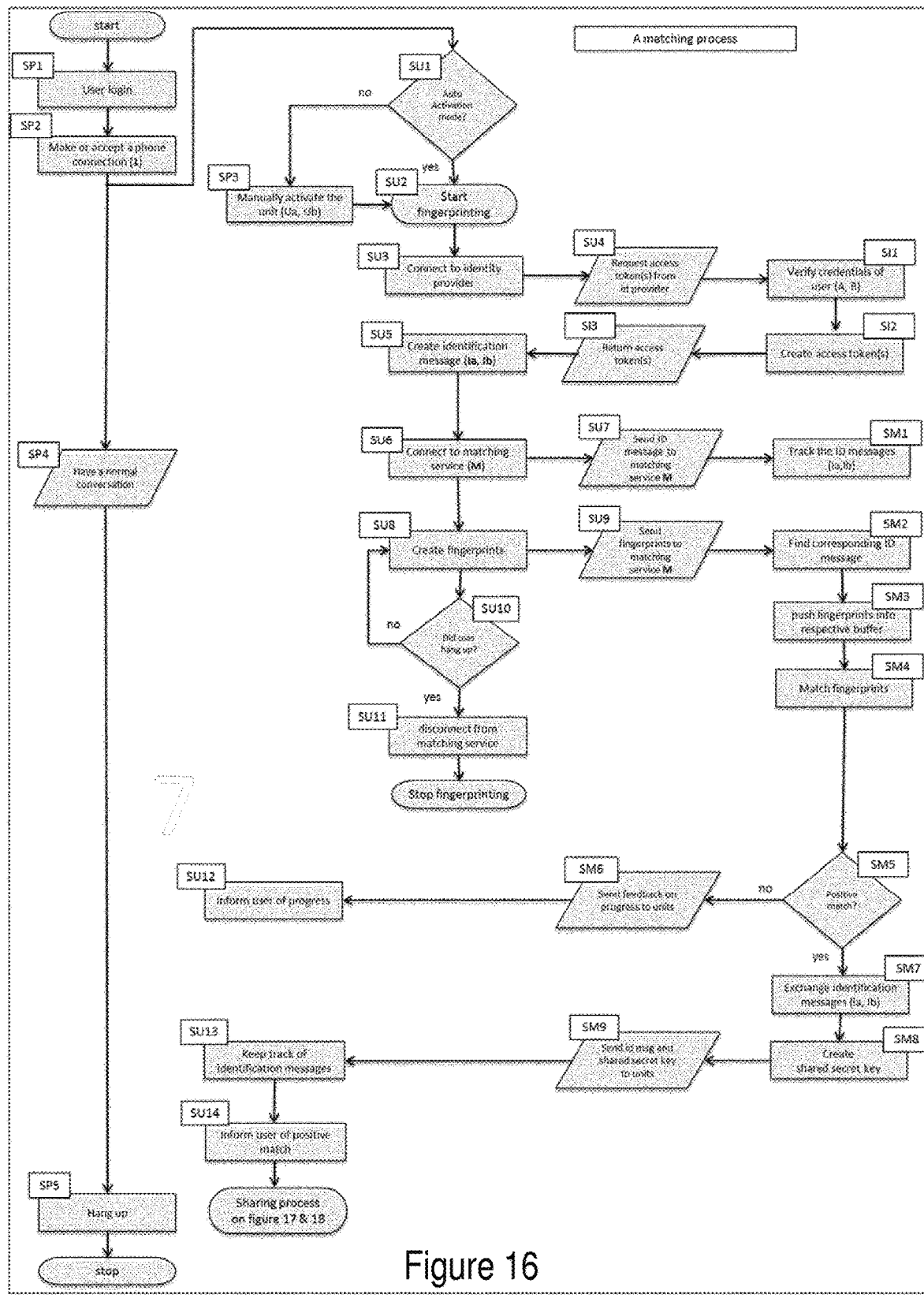
FIG. 16 is a flowchart of a preferred matching process according to an embodiment of the present invention.

The following section describes the steps of a preferred matching process which can be used with any of the embodiments of the present invention. The letters and numbers refer to components on the drawings and notations starting with [S] refer to steps in the flowchart of FIG. 16:

1) [SP1] The participants (A, B, . . . ) login in to their devices or applications in a suitable way which can be a conventional way. Optionally, this can be done automatically using for instance a single-sign-on mechanism.

2) [SP2] Participant (A) sets up a human voice communication such as a phone call over a network (1) using human voice communication devices such as phones (Pa,Pb) with participant (B). Participant B accepts the call [SP2] and they start a normal conversation [SP4]. The phone call may be as defined above Def(N).

3) [SU1] In case the fingerprint unit is configured with automatic activation mode switched on, the fingerprint unit is activated automatically by the phone system, when an outgoing or incoming call is made [SU2]. This can be the case for instance in a phone conference or video conference system. Also in the case of an app on a mobile phone, the fingerprinting app (Ua,Ub) can register itself as a software service that is automatically activated by the operating system of the phone (Pa,Pb), when an incoming or outgoing call (1) is made.

4) [SP3] In case the fingerprint unit is configured with automatic activation mode switch off, the participant (A, B, . . . ) needs to activate its fingerprinting unit (Ua, Ub, . . . ) manually, by either powering on the device, or activating an app on a mobile phone such as an iPhone or by any other means. This activation can be done prior to the human voice transmission, e.g. before the phone call or during the call.

5) [SU3] Upon activation of the fingerprinting unit, the unit (Ua, Ub) preferably sets up or allows other network elements to set up a secure connection to an identity provider. This can be a service that is part of the same single-sign-on mechanism in a corporate network, or it can be a trusted third party on the internet, such as services provided by companies like Google or Microsoft.

6) [SU4] The unit requests the identity provider one or more access tokens, on behalf of the user (A, B) using the credentials the unit is given to, by for instance the single-sign-on mechanism. The access token can be any suitable access token, for instance an open ID connect access token, or a SAML access token, that is supported by the sharing applications (Sa, Sb). The access tokens serve to grant access on behalf of the user to networked resources on the devices of the user and/or on sharing services (T) on a computer network or the internet. The access tokens preferably contain an access scope, which limits the grant of access to certain usage scenarios, for instance including scenarios to connect and communicate with networked devices, but excluding scenarios to access any electronic content. The access tokens may optionally contain the public IP address of fingerprinting unit, allowing other units to connect to it. And the access tokens preferably also contain an expiration time, which limits the grant of access in time.

7) [SI1] The security provider service verifies the credentials of the respective user (A, B, . . . ). Remark that this conventional authentication and verification mechanism is weak, because the credentials may for instance be stolen by an attacker. If the credentials can be verified, the identity provider creates the requested access token(s) [SI2] and returns them to the fingerprinting unit [SI3].

8) [SU5] The fingerprinting units (Ua,Ub) each create an identification message (Ia, Ib). The identification message may be as defined in DefL above. The identification message (Ia,Ib) preferably contain information on the identity of the participant, such as the name, with optionally a picture or an avatar, that can be used in user interfaces. Also, the identification message preferably contains the requested access token(s) from the identity provider.

9) [SU6] The unit (Ua, Ub) sets up or allows other network elements to set up a secure connection (for example 7a, 7b of FIG. 2, or 5a, 5b of FIG. 3) to a central matching service (M) on the computer network (N).

10) [SU7] The unit sends the identification message to the matching service (M).

11) Optionally, a VPN anonymizing proxy (P FIG. 3) is used, that sits in front of the matching service (M) and connected thereto via connection (6). In such a case the units (Ua,Ub) make a connection (5a and 5b) to the proxy (P). The connections (5a, 5b, 6, 7a, 7b) are preferably setup using conventional authentication and encryption protocols. This setup phase is further described in the section "The setup of secure and anonymizing tunnels".

12) [SM1] The matching service keeps track of the identification message, for each connecting fingerprinting unit and also creates a memory buffer to store the fingerprints, for each connecting fingerprinting unit. See the section "A matching algorithm", for a more detailed description of a preferred algorithm.

13) [SU8] The fingerprinting units (Ua, Ub) sample the audio signal from respective inputs (4a and 4b) and preferably create continuous streams of audio fingerprints. A preferred method used to create the fingerprints is further described in the section: "The fingerprinting algorithm". A unique digest of the original audio signal is made, e.g. by application of a one-way function such as a hash. The application of the unique digest producing element can result in a content degradation to such a degree that the resulting signal only carries enough information to be used in a comparison or matching operation. In such a case, the fingerprints cannot be used to recreate the original audio signal in any way or any such reverse operation is very time consuming and difficult, e.g. when a one-way function is used. In countries that forbid any form of copying and recoding of telephone call, the appropriate one-way functions can be used. Then As such, no copying or recording of the phone call is made.

14) [SU9] The fingerprinting units (Ua, Ub) send the fingerprints, preferably, in small batches (for instance one message per second) to the matching service (M).

15) In case an anonymizing proxy is used, the proxy (P) receives the fingerprints from various fingerprinting units over connections (5a, 5b) and forwards them to the matching service (M) over connection (6), see FIG. 3—and see the section "setup of secure and anonymizing tunnels" for more details on the flow of the messages.

16) [SM2] The matching service (M) looks up the corresponding identification message (Ia, Ib) of the incoming fingerprints and [SM3] pushes the fingerprints into the respective memory buffer.

17) [SM4] The matching service (M) matches the fingerprints, preferably according to the algorithm outlined in section: "A matching algorithm".

18) [SM5] When the matching service (M) detects a positive match, it can exchange the identification messages (Ia, Ib), such that each participant receives the identification messages of all the other participants [SM7].

19) [SM6] In case no positive match can be made with the fingerprints of a specific unit, the matching service can send feedback on the progress of the matching process for that unit. Also, the matching service can return information on detected anomalies, such as the detection of a silent participant, which can be a potential eavesdropper. [SU12] The fingerprinting unit preferably informs the participant of the progress and any detected anomalies.
20) [SM8] The matching service (M) can generate a session key, preferably a secret session key of which a random session key is one example, by using the fingerprints of one or more participants as seeds for a suitable encryption routine such as a pseudo-random number or alphanumeric message generator. This can be done safely because the fingerprints are unique and contain lots of entropy and this leads to a highly unpredictable, random key. The matching service (M) adds copies of this key, as a shared secret, to the identification messages (Ia, Ib). This key can be used by the sharing applications (Sa, Sb) as a pre-shared secret to start off conventional cryptographic key-exchange protocols to set up additional secure communication channels for the sharing of electronic data.
21) [SM9] The matching service (M) sends the identification messages (Ia, Ib) of the correspondents back to the fingerprinting units (Ua, Ub). As such, each fingerprinting unit (Ua, Ub) receives the identification (Ia, Ib) messages of all other participants, and the same secret key.
22) [SU13] The fingerprinting unit keeps track of the identification messages (Ia, Ib) of all correspondents of the phone call or phone conference.
23) [SU14] The fingerprinting unit (Ua,Ub) informs the user (A, B) of the positive match, preferably using the name(s) of the correspondent(s) and the picture(s) or avatar(s) present in the identification message(s) and by using a visual message, or by a tactile signal, an audible signal or any combination of these.
24) From this point onwards, any participant can now easily setup additional secure communication channels, using the identification messages to start the sharing process. Depending on the sharing capabilities and the type of the shared content, different communication structures, such as peer-to-peer or client-server, can now be set up. Two possible workflows for sharing electronic content are further described in the following sections.
25) [SP5] When the participants hang up the phone, or disconnect the voice communication, the fingerprint unit stops fingerprinting and disconnects from the matching service [SU11]. The sharing process can still continue to run, depending on the specific embodiments.

D) The Workflow of a Sharing Process, with Embedded Sharing Functionality

Figure 17:
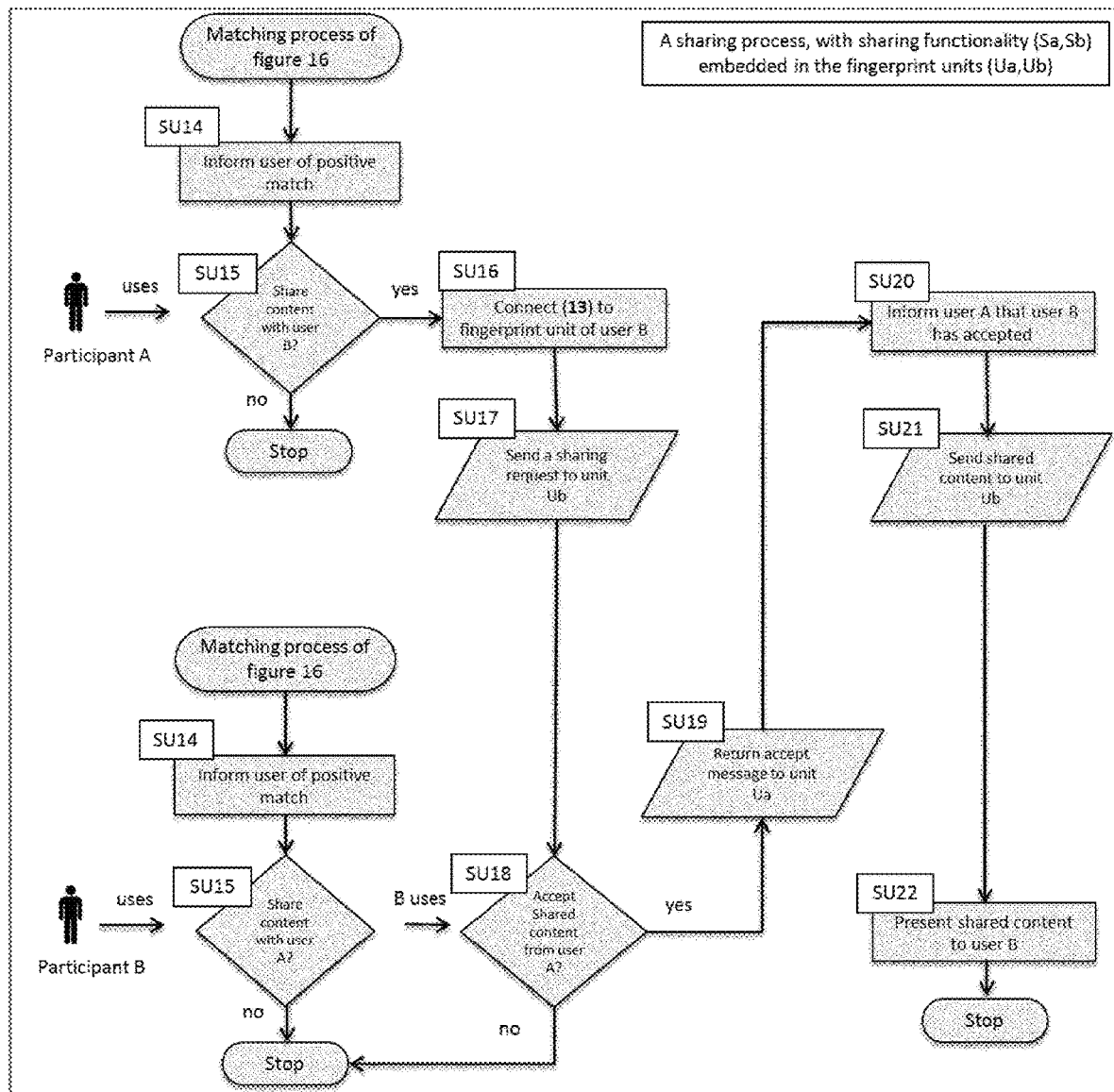
FIG. 17 is a flowchart of a preferred process for sharing electronic content, where a sharing functionality (Sa, Sb) is embedded in the fingerprint units, according to an embodiment of the present invention.

The following section describes the steps of a sharing process, in which a sharing functionality (Sa, Sb) is embedded in the fingerprint units (Ua,Ub). This process starts off where the matching process workflow, described in the previous section, has stopped. This process can be used with any of the embodiments of the present invention. The letters and numbers refer to components on the drawings (FIG. 1) and notations starting with [S] refer to steps in the flowchart of FIG. 17:
1) [SU15] The participants have now been informed by the fingerprinting units that a positive match has been made. Any participant (A, B, . . . ) can now choose to share electronic content with a simple push of a button, and without any additional login procedure. The participant is for instance presented with a list of possible sharing functionalities. The content of this list depends of what is installed and configured. By choosing to share content, the participant implicitly, but clearly and transparently authenticates the identity of the correspondent(s) he hears on the phone. It is at this step that the weak pairing that existed between the participants and the applications that act on their behalf becomes much stronger, because it is now the human user that confirms that his correspondents does indeed have the presumed identity. It is also at this step that any attacker or impersonator is likely to be stopped, by the genuine participants that use their capability to detect deceit and to authenticate people based on social and cognitive skills, common sense and the knowledge of the specific context. The following steps, the message flow and the used protocols are dependent of the specific sharing functionality. In this specific sharing process, a sharing functionality is embedded in the fingerprinting unit, and there is no other sharing application involved.
2) [SU16] In the case of this example, the sharing functionality finds the public IP address of the fingerprinting unit (Ub) in the identification message (Ib) and makes a peer-to-peer connection with the fingerprinting unit Ub. (FIG. 1, connection 13). The fingerprint units of the participants are able to find each other in an ad hoc situation, without the help of a user database with registered users and their permissions. Even if none of participants have ever met each other, and even if they all use different access control systems with incompatible security mechanisms, they can still find each other because they start off from a very common user database, a simple phone book. And after the voice communication and/or the data exchange has been completed all connections, permissions, privileges and registered users can be torn down again leaving no rights or privileges outstanding.
3) [SU17] The unit (Ua) sends a message to the unit Ub asking whether the user is willing to accept the electronic content from user A.
4) [SU18] The unit (Ub) receives the sharing request and presents it to the participant B.
5) [SU19] Participant B accepts the sharing request and the unit Ub sends the response back to unit Ua.
6) [SU20] Unit Ua informs the user A of the acceptance of user B and sends over the electronic content [SU21], which is then presented to user B. [SU22].

E) The Workflow of a Sharing Process, Using a Sharing Service (T)

Figure 18:
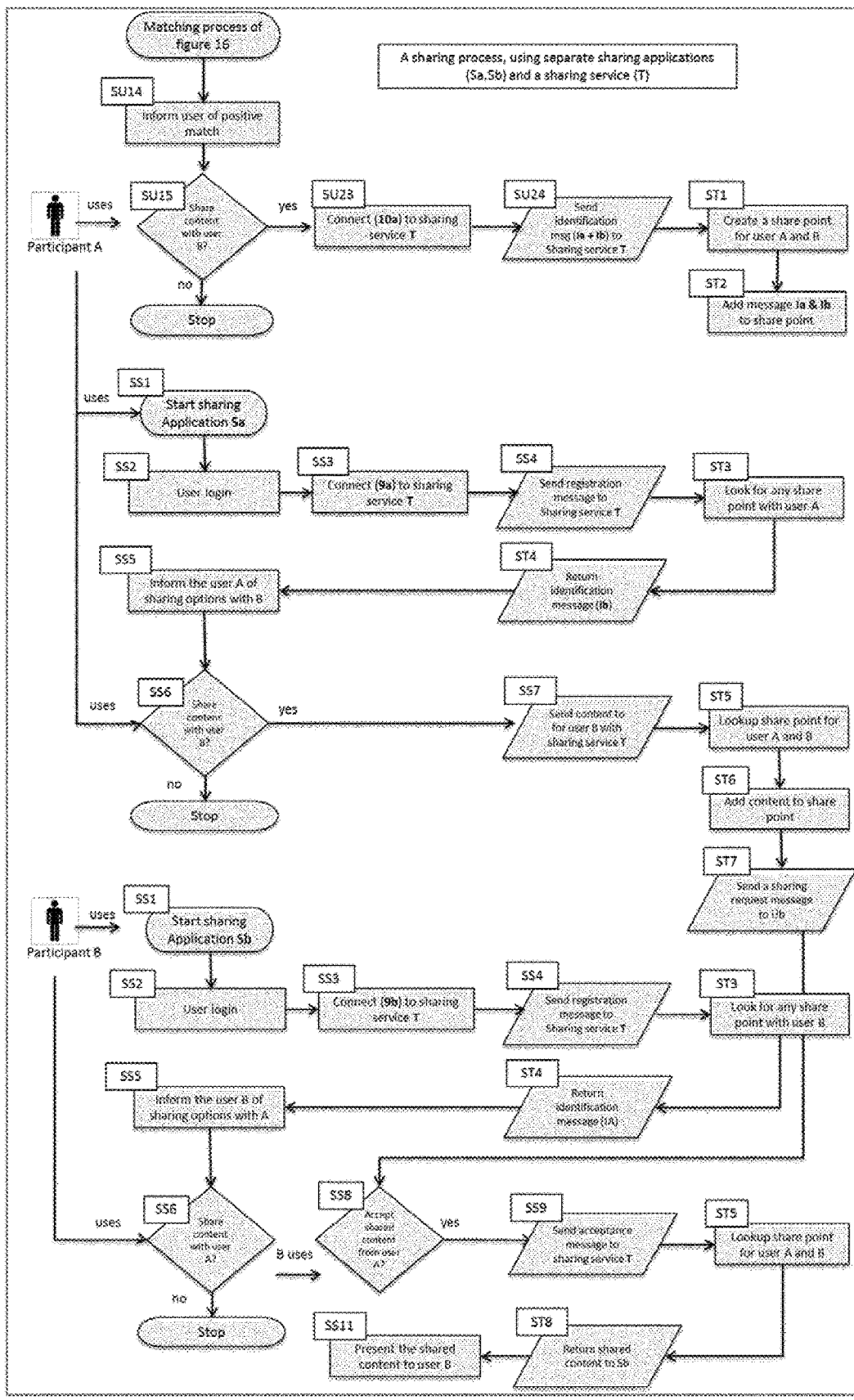
FIG. 18 is a flowchart of a preferred process for sharing electronic content, where the sharing functionality is embedded in a separate sharing application (Sa, Sb), and where the sharing applications use a sharing service (T) to share electronic content, according to an embodiment of the present invention.

The following section describes the preferred steps of a sharing process, in which a sharing functionality (Sa, Sb) is embodied in separate sharing applications (Sa, Sb), which are in this example installed on separate devices, with no direct communication with the fingerprint units (Ua,Ub). This example illustrates how it's possible to extend a strong pairing bond as described above between the fingerprinting unit and the participant to other sharing applications, even when these are installed on other devices or computers. This process starts off where the matching process, described above, has stopped. This process can be used with any of the embodiments of the present invention. The letters and numbers refer to components on the drawings (FIG. 4) and notations starting with [S] refer to steps in the flowchart of FIG. 18:

1) [SU14] The participants (A, B, . . . ) have now been informed by the fingerprinting units that a positive match has been made and the units present the users with for instance a list with possible sharing options [SU15].
2) [SU15] In this sharing process example, the participant (A) instructs his unit (Ua) to connect to a sharing service (T) by choosing for instance an item in a list. This sharing service can be hosted on the internet, on a corporate network or inside a de-militarized zone. In such a case that the sharing services are provided by a webserver, the URL of this webserver providing the services is configured during installation of the fingerprinting units. See FIG. 4.
3) [SU23] The fingerprinting unit (Ua) preferably setup secure connections (10a, 10b) to the sharing service (T).
4) [SU24] The fingerprinting unit (Ua) sends the identification messages of preferably all participants to the sharing service (T).
5) [ST1] The sharing service (T) creates preferably for each new sharing group a share point, i.e. a structure where all shared data and meta-data is assembled. [ST2]
6) [SS1] The participants (A, B, . . . ) start their sharing applications (Sa, Sb, . . . )
7) [SS2] The participants login to their applications (Sa, Sb, . . . ) in a conventional way. This can be done automatically using for instance a single-sign-on mechanism.
8) [SS3] Upon startup of the sharing applications, the application preferably sets up a secure communication (9a, 9b, . . . ) with a sharing service (T).
9) [SS4] The sharing application preferably sends a registration message to the sharing service.
10) [ST3] The sharing service looks up any existing share point for the registered user. In case such a share point exists, the sharing service returns the identification message(s) assembled in the share point. [ST4]
11) [SS5] The sharing application informs the user (A, B, . . . ) of the sharing options with the corresponding participants, preferably using the name(s) of the correspondents and optionally a picture or an avatar, which can be present in the identification messages (Ia, Ib).
12) [SS6] From this point onwards, any participant (A, B, . . . ) can now choose to share electronic content with a simple push of a button, and without any additional login procedure. The sharing application (Sa, Sb, . . . ) can for example present the user with a list of supported sharing functionalities, and can request whether the user wants to share content with the listed participants. Again, by choosing to share content, the user (A) implicitly authenticates the identity of the correspondent(s) (B, . . . ) which he hears on the phone (Pb, . . . ) and this reinforces the weak paring bond that existed between that participant (B, . . . ) and the application (Sb, . . . ) that acts on its behalf.
13) [SS7] When for instance the user A decides to share content, the sharing application (Sa) sends the selected content to the sharing service (T), where it is added to the share point [ST5, ST6]. The sharing service then sends for instance a sharing request message to units of other participants (B, . . . ) [ST7].
14) [SS8] The unit (Ub, . . . ) receives the sharing request and presents it to the participant B.
15) [SS9] When participant B accepts the sharing request, the sharing application (Sb) sends an acceptance message back to sharing service (T).
16) [ST5] The sharing service (T) looks up the share point and returns the shared content to sharing application Sb [ST8].
17) The sharing service informs the user A of the acceptance of user B. (not shown in flowchart.)
18) [SS11] The sharing application then presents the shared content to user B.
19) Again, when the voice communication and/or the data exchange have been completed all connections, permissions, privileges and registered users can be torn down leaving no rights or privileges outstanding.

F) The Setup of Secure and Anonymizing Tunnels

The section outlines in detail how the connections are setup with the optional anonymizing proxy (P FIG. 4) and how the messages flow in case the matching service makes a positive match.

In some applications, it can be suitable to use one or more anonymizing proxies (P) that hide the public IP addresses of the fingerprinting units. This is suitable in applications where neither the matching service (M) nor the proxy (P) can be allowed to figure out, who is calling with whom, for instance, in case the matching service (M) is deployed on the internet and accepts connections from the general public— see FIG. 3.

Figure 7:
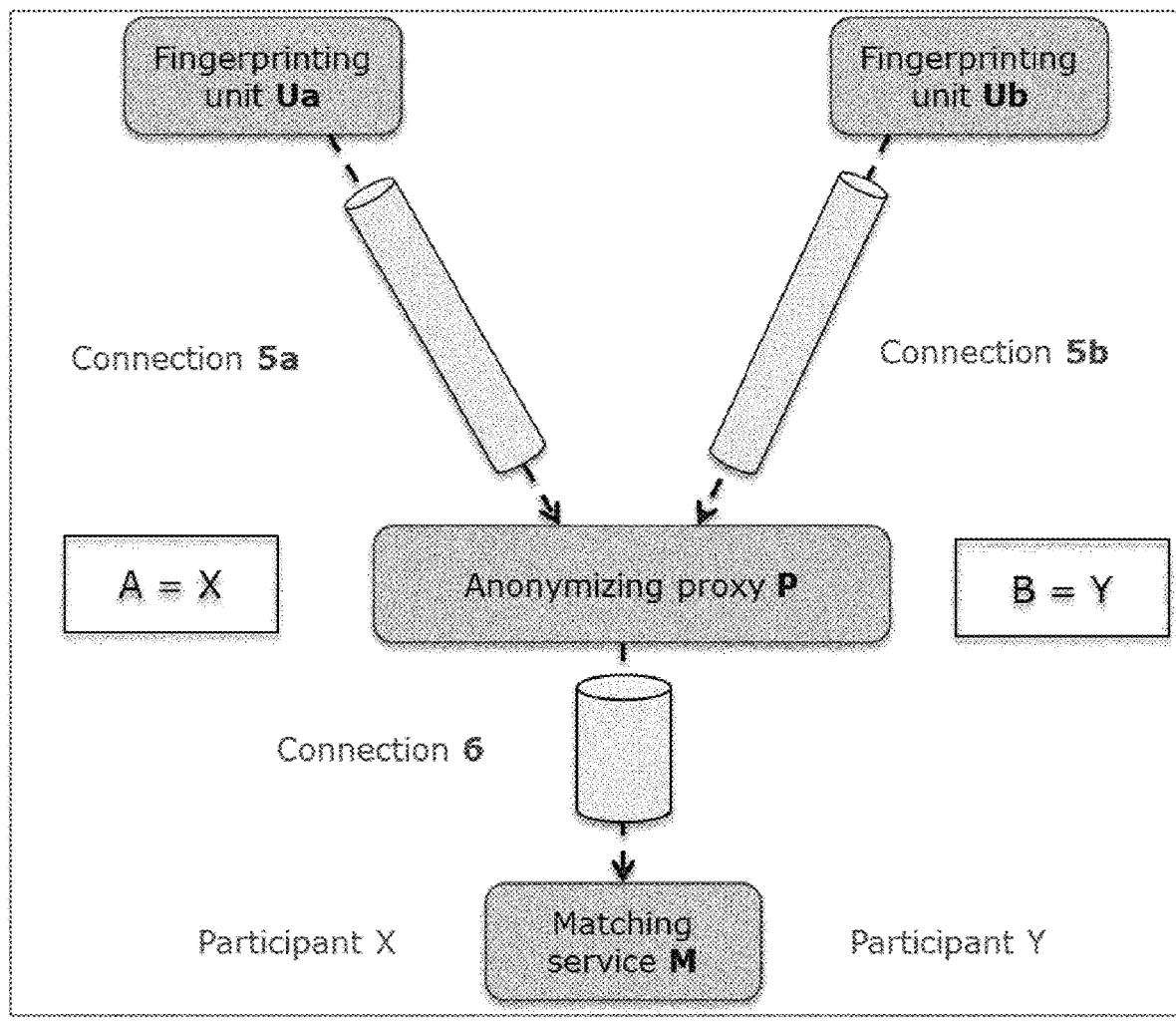
FIGS. 7 to 15 are schematic representations of a system and a message flow for matching fingerprints according to an embodiment of the present invention using a anonymizing proxy.
Figure 8:
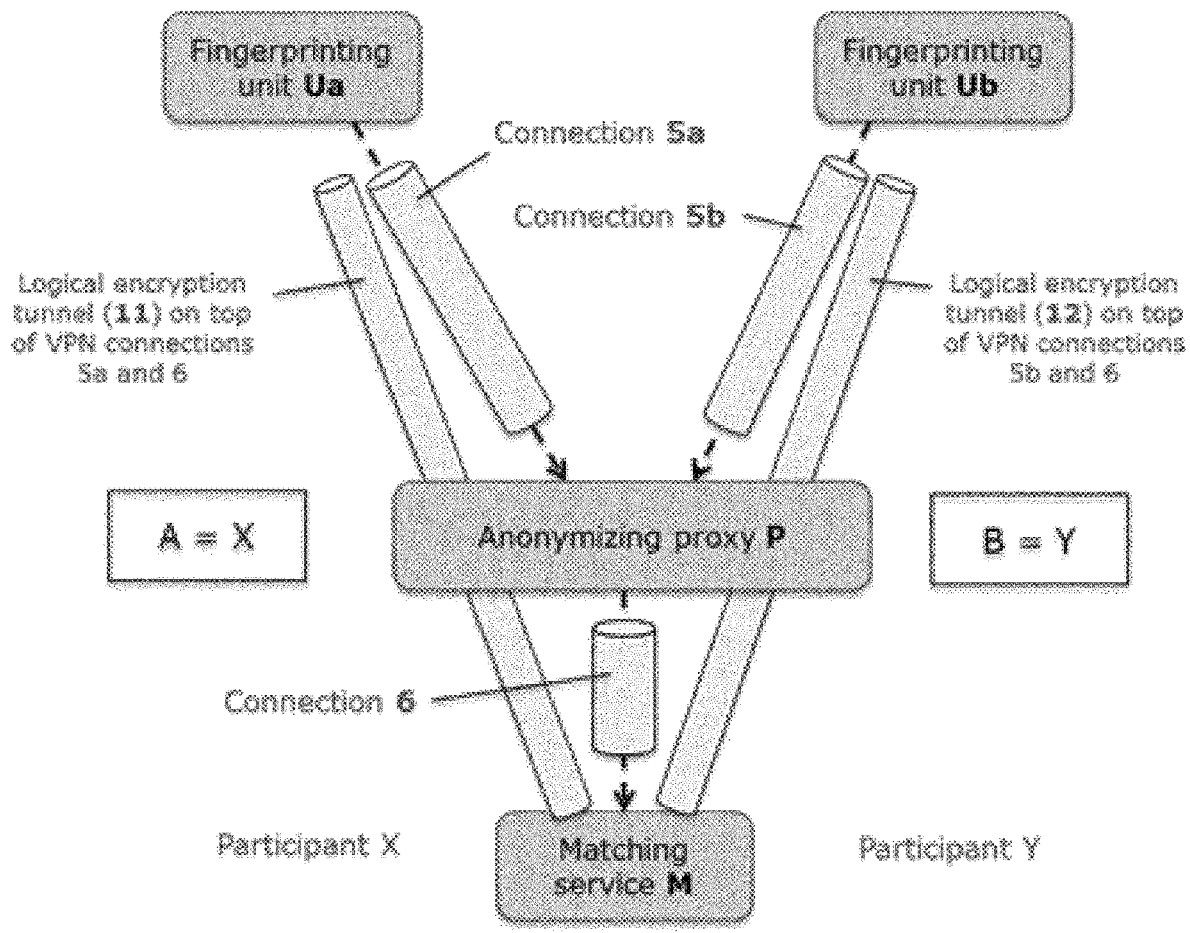
Figure 10:
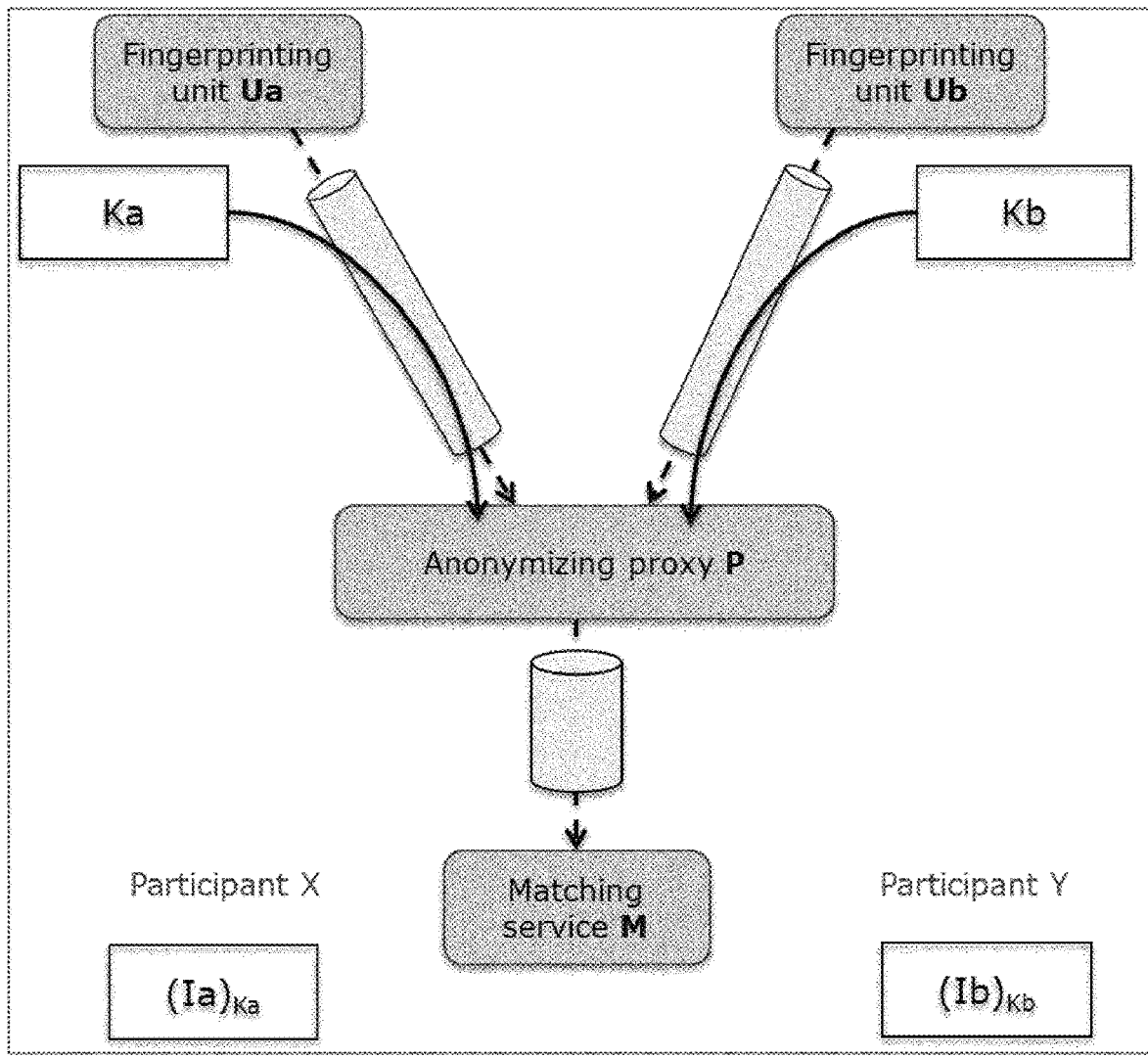
Figure 11:
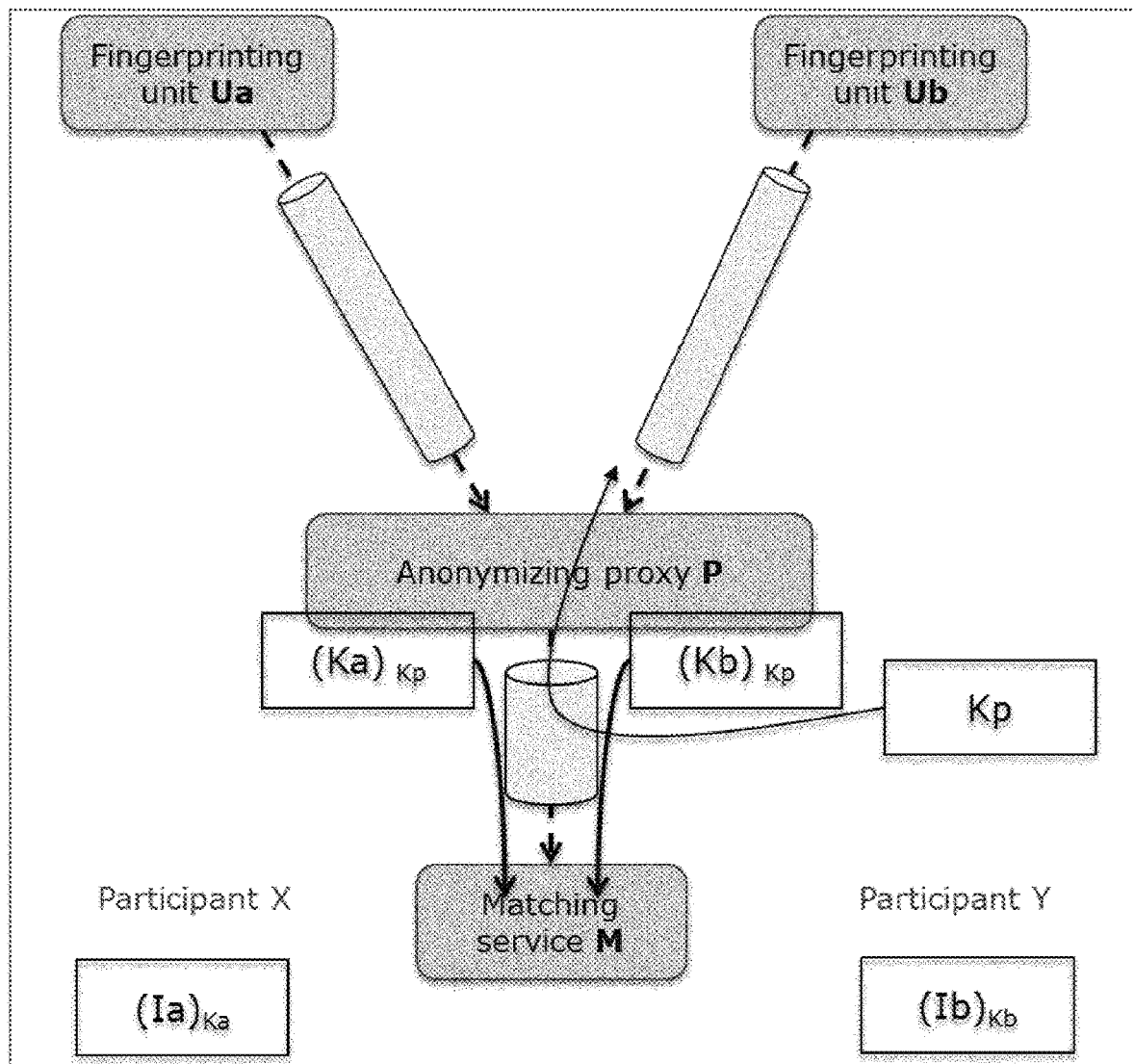
Figure 12:
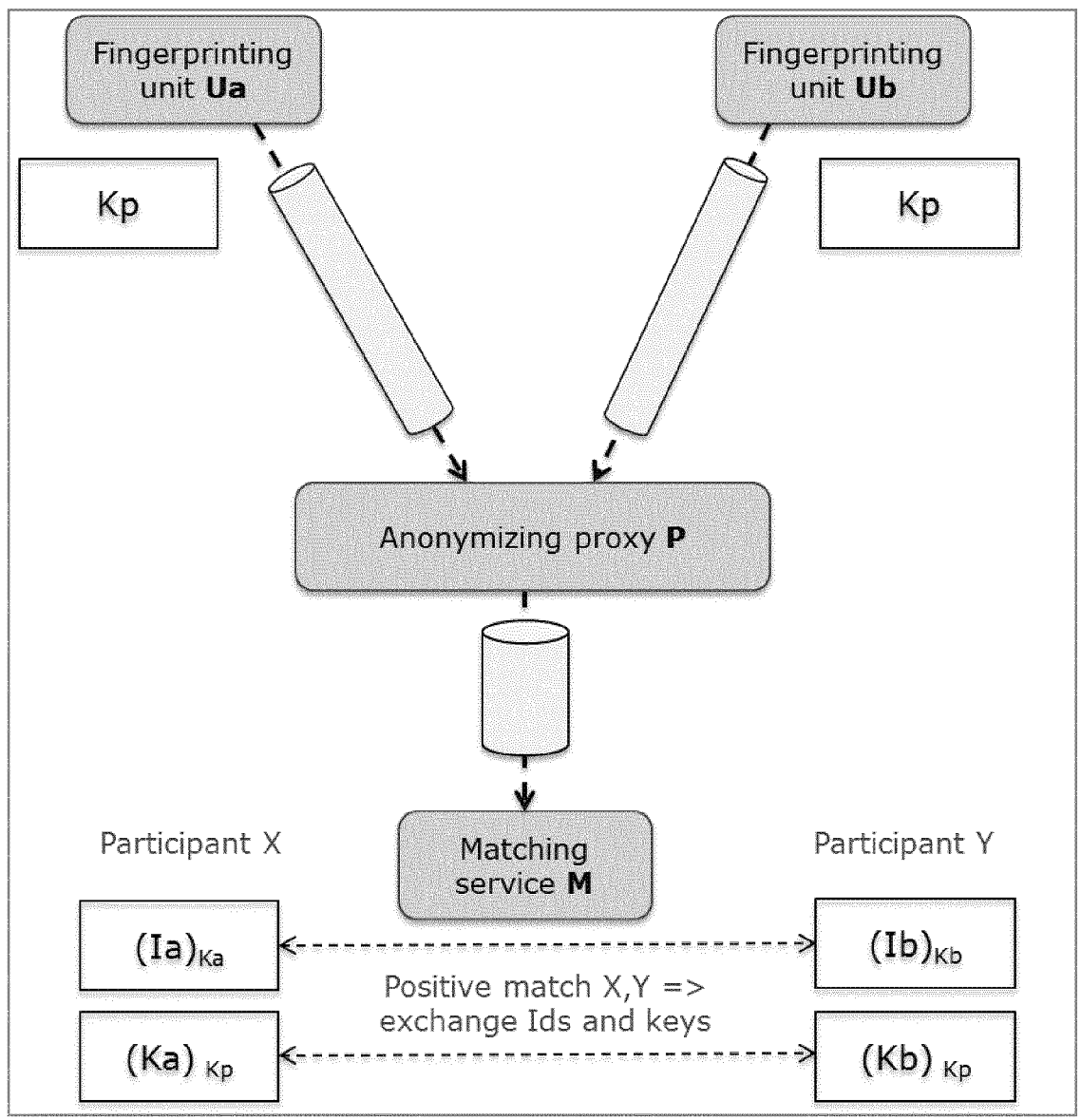

1) At startup, the proxy (P) sets up a secure connection (6 FIG. 3) with the matching service (M). This can be done preferably using a secure protocol such as IPsec VPN protocols (tunnel mode) or optionally using SSL/TLS protocols. The proxy (P) verifies the identity of the service (M) by using a cryptographic mechanism such as an asymmetrical system such as use of the Public Key Infrastructure (PKI, not shown on drawing) or a symmetrical system such as by using a pre-shared secret or by any trusted certificate authority system—see FIG. 7.
2) Referring to FIG. 7, upon activation of a fingerprinting unit, this unit (Ua, Ub) preferably sets up a secure connection (5a, 5b) with the anonymizing proxy (P). This can be done preferably using IPsec VPN protocols (tunnel mode) or optionally using SSL/TLS protocols. The unit (Ua, Ub) verifies the identity of the proxy (P) by using a suitable encryption system such as an asymmetrical system like the Public Key Infrastructure (PKI, not shown on drawing) or a symmetrical system by using a pre-shared secret or any trusted certificate authority system. A pre-shared secret is generally more vulnerable but doesn't require a trusted certificate authority. A pre-shared secret can be distributed to the fingerprinting units during installation phase or during regular software upgrades—see FIG. 7. The proxy forwards and anonymizes the messages of the fingerprinting units for the matching service. And the proxy also returns the responses from the matching service (M) back to the relevant fingerprinting unit.
3) One or more fingerprinting units (Ua, Ub) preferably setup an additional encrypted communication channel or tunnel (Tunnel 11 and 12 of FIG. 8) with the matching service (M) on top of the VPN tunnel connections (5a and 6, 5b and 6, respectively). The messages sent through this tunnel (11 and 12 of FIG. 8) are preferably not readable by the proxy (P). Preferably, the proxy (P) just forwards the messages as before, but their payload is encrypted and is only readable by the matching service.
4) Fingerprinting Units (Ua, Ub) carry out an appropriate cryptographic procedure such as generating an encryption key such as a random encryption key (Ka, Kb) and use this key to encrypt an identification message (Ia, Ib). This message contains metadata such as a public IP address, and/or the name of the participant (A, B) or other data such as a GPS location. The fingerprinting unit sends this message through the encryption tunnel 11, 12) to the matching service—see FIG. 9.
5) Units (Ua, Ub) send the encryption key (Ka, Kb) to the proxy (P)—see FIG. 10.
6) The proxy (P) continues with the appropriate cryptographic procedure such as encrypting this key with its own key (Kp) and then sending the encrypted key (Ka,Kb) to the matching service (M). Preferably, the proxy (P) uses the same key (Kp) for all fingerprinting units. The proxy sends this key (Kp) as a response to the fingerprinting units (Ua, Ub)—see FIG. 11. The fingerprinting units will need this key later in the process. The proxy (P) preferably changes this key at regular intervals, for instance once every day. When it is nearly time to change the key, the proxy (P) preferably also sends the next key Kp+1 to the fingerprinting units and when the key has recently been changed, the proxy preferably also sends the previous key Kp−1 to the fingerprinting units, otherwise a unit may receive the wrong key.
7) The matching service (M) keeps track of these messages (Ia,Ib). The service (M) knows which identification message (Ia, Ib) belongs to which fingerprints, but the service preferably cannot read or decipher the messages (Ia,Ib) nor, preferably, does it know the IP address of the fingerprinting units. At this stage, the fingerprinting units (Ua, Ub) are ready to send fingerprints to the matching service. When a little later say a few seconds later, the matching service makes a positive match, the matching service exchanges metadata such as the identification messages (Ia, Ib) and the encrypted keys (Ka, Kb)—see FIG. 12.
8) For example, the matching service sends the ID and the encryption key of the correspondent of participant X to its (relevant) unit Ua through the encryption tunnel (tunnel 11)—see FIG. 13. Since the service M answers each fingerprint message with a response message, no special arrangements need to be taken, to obfuscate the positive match for the proxy.
9) The matching service sends the ID and the encryption key of the correspondent of participant Y to its unit Ub through the encryption tunnel (tunnel 11)—see FIG. 14.
10) In the final step, both fingerprinting units (Ua, Ub) have the identification messages (Ib, Ia) of their correspondent, the encryption key (Ka, Kb) of their correspondent and the encryption key (Kp) of the proxy—see FIG. 15. As such, the fingerprinting units can decrypt the encryption keys and then decrypt the identification messages themselves.
11) In case no such proxy (P) is used, the fingerprinting units can set up secure connections to the service (M) directly. And the fingerprinting units can send the identification messages to the matching service (M) without any additional encryption. In such case, the service (M) knows the identity of the users. In some applications the matching service (M) can also be instructed to verify whether the users have the required level of authorization to use that application or to access the confidential resource. This may be done by querying a user database (D) in which such levels of authorizations per used are stored—see FIG. 2.
12) Note in the above embodiment a specific method flow is described. The present invention is not restricted to this flow. Alternative cryptographic mechanisms can be used and even no cryptographic mechanism needs to be used if the participants believe there is no risk of being compromised.

G) An Audio Fingerprinting Algorithm

The following section outlines a human voice audio fingerprinting algorithm which can be used with any of the embodiments of the present invention as described above. The fingerprinting algorithm is carried out by any of the fingerprinting units mentioned above:
1) The human voice audio signal from the phone is sampled by a sampler, e.g. in the fingerprinting unit, at a sampling rate, for example at a frequency of 8 KHz. This is considered sufficiently high to capture the human voice but higher or lower rates may be used.
2) The fingerprinting algorithm can work in frames, whereby each frame comprises a number of human voice audio samples. A frame preferably contains 4096 samples, or is 512 milliseconds long. Shorter frames can also be used. Stereo channels can be treated separately but preferably they are—combined to form a single mono channel. The sampling resolution is preferably 16 bit deep.
3) The fingerprinting is preferably done using two audio buffers in the fingerprinting unit: while the one buffer is being filled with new audio samples, the second one is being fingerprinted, and the result sent to the matching service.
4) The frames are copied into buffers such as circular buffers in the fingerprinting unit. The samples in that frame are filtered with a suitable window function. A window function is also known as an apodization function or tapering function, is a mathematical function that is zero-valued outside of some chosen interval. The window may have a plurality of dimensions. When another function or waveform/data-sequence is multiplied by a window function, the product is zero-valued outside the interval. All that is left is the part where they overlap. The window functions can be non-negative smooth "bell-shaped" curves, rectangles, triangles, or other functions that have a property of producing a limited range or "window" of results. The present invention also allows a more general definition of window functions that does not require them to be identically zero outside an interval, as long as the product of the window multiplied by its argument is square integrable and, more specifically, that the function goes sufficiently rapidly toward zero
5) An example of a window function is a Hanning windowing function or a sliding Hanning windowing function. This windowing function is defined as follows:

$$w(n) = 0.5\left(1 - \cos\left(\frac{2\pi n}{N-1}\right)\right)$$

Where N equals the size of the window and n is the amplitude of the sample.

6) The windowed samples are transformed to the frequency domain via any suitable algorithm such as the fast Fourier transformation (FFT) or a wavelet algorithm.
7) The frequency samples are then copied into a number of frequency bins, such as 24 frequency bins. The bandwidth of the frequency bins is preferably smaller for lower frequencies and wider for higher frequencies. Frequencies below 200 Hz and above 2024 Hz can be attenuated or cut off. The cut-off frequencies of the subsequent energy bins are chosen in ay suitable way, e.g. as follows: 200, 240, 283, 329, 378, 430, 485, 544, 606, 671, 739, 810, 884, 962, 1043, 1127, 1214, 1304, 1397, 1494, 1594, 1697, 1803, 1912 and 2024. The number of bins can be increased to for instance to 32 bins to create a more precise fingerprint.
8) The total energy level of each frequency bin (or band) is then determined. For example the energy level of each bin can be calculated as the sum of all magnitudes of the frequency samples. The magnitude of the sample can be calculated for example as the square root of the real component squared plus the imaginary component squared.
9) The following logic can be applied over the plurality of bins, e.g. 24 frequency bins. If $E(b)_t$ is the energy of the frequency bin b at time t and $E(b+1)_{t-1}$ is the energy of band b+1 at time t−1, then the bit b of the fingerprint is 1 if
   $E(b)_t - E(b+1)_t$ is bigger than $E(b)_{t-1} - E(b+1)_{t-1}$. Otherwise the bit is zero.
10) As such, for each bin sub-print is made for the plurality of bins, e.g. a 24 bit sub print is created for 24 frequency bins.
11) Then the sliding windowing function is moved forward by a time period, such as 16 milliseconds and a new sub-print is calculated. A complete frame is made up of all the sub-prints, e.g. for a frame of 512 milliseconds there are 32 sub-prints of 24 bits or a single fingerprint of 96 bytes long. Preferably, each sub-print overlaps a great deal in time with the following sub-print.
12) Each fingerprint can be time-stamped by the fingerprinting unit.
13) The fingerprints can be sent to the matching service in small groups, for instance, per 8 fingerprints.

H) The Matching Algorithm

The matching service (M) compares all incoming streams of fingerprints in real-time and attempts to match two or more of them. An algorithm for this matching is carried out by any matching service mentioned above and can be as follows:
1) The following procedure can be used with any of the embodiments of the present invention. For example, the service (M) and the units (Ua, Ub, . . . ) keep a clock, preferably an accurate clock to generate timestamps. The matching service and the fingerprinting units estimate the difference between the clock of service M and the clock in each of the connected fingerprinting units, as follows. Each message with fingerprints is time-stamped as it leaves the fingerprinting unit, and again as it received by the matching service. In addition, each response back to the fingerprinting units is time-stamped as it leaves the service and as it is received by the fingerprinting unit. As such, the fingerprinting unit is provided with a processing engine able to calculate how much time went by during the transmission and during processing of the last message. The fingerprinting unit can estimate, using the processor, the difference between the service clock and its own unit clock, by assuming the network delay is constant. The fingerprinting unit tracks this difference and adds it to each new fingerprint message. The service M keeps track of all the differences and uses them to align the fingerprints of all connected fingerprinting units in time.
2) The service M pushes the fingerprints into buffers especially circular buffers located in system memory of the matching service (M). The buffers only store the fingerprints of the last few seconds. The buffers also keep track of the time of each of fingerprints, according to the service clock.
3) At specific intervals, for instance once every second or half a second, the service compares the fingerprints of each of the fingerprinting units, with those of each other unit, as follows:
   The fingerprints are matched over a fixed period, preferably close to a second, or for example 2 frames of 512 milliseconds.
   The fingerprints for different fingerprinting units are compared, e.g. if there are two fingerprinting units the fingerprints are compared two by two, and, by shifting the time relative to one another in small increments, as small as 32 milliseconds, up to a total time shift of one or more seconds. So the fingerprint of unit A, taken at time t1, is compared with fingerprint of unit B taken at t1, and once again at t1 plus 32 ms, and again at t1 plus 64 ms and so. This is needed to compensate for the delay of the telephone network and the delay of the computer network. These delays can re-enforce one another and can be different for the two fingerprints as their paths to the matching service can be different.
   For each time shift, a matching similarity or dissimilarity can be determined. For example the hamming distance can be calculated as the number of individual mismatched bits in the total fingerprint.
   In addition, the output of the matching similarity or dissimilarity algorithm such as the calculation of the hamming distance can be corrected with a factor expressing how unique the time shift is relative to all other time shifts:
      With 'Hamming' being the output of the matching similarity or dissimilarity algorithm, e.g. the hamming distance;
      With 'Avg' equaling an average or representative value of the results of the matching similarity or dissimilarity algorithm, e.g. the average of the hamming distance;
      With 'S' being the standard deviation;
      With 'U' a factor expressing how unique the value hamming distance is.

$U = (Avg - Hamming)/S$

To reward highly unique values, a correction factor can be calculated as follows:
   With 'b' a factor that determines the slope; (ie. 3)

$Correction = (e^{(u-2)} - e^{(-u+2)})/b$

Where corrections smaller than zero are rejected, the match can be calculated as follows, with 'Length' equaling the total length of the fingerprint in bits:

$Match = 100 - (100*(Hamming/Correction))/Length$

Figure 6:
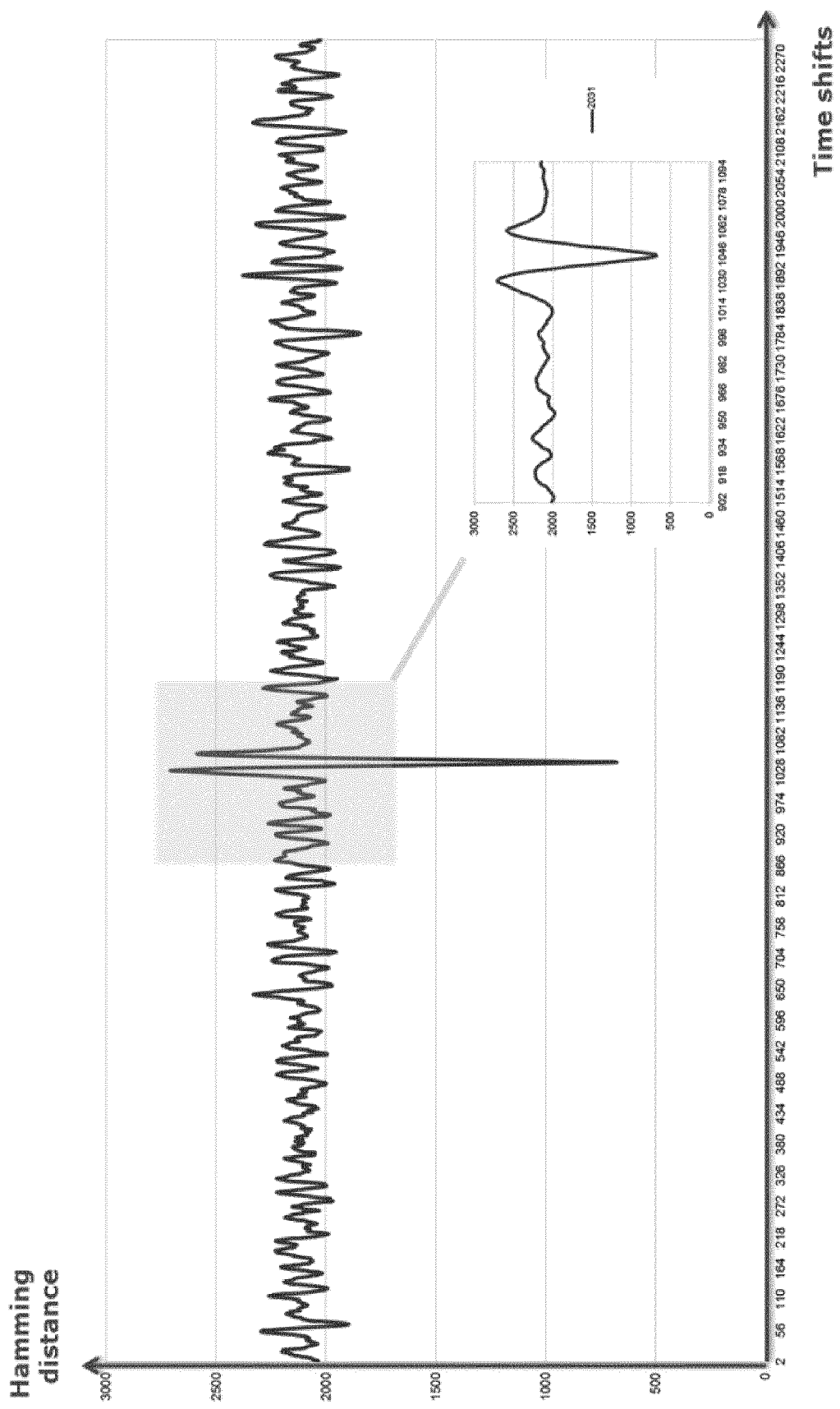
FIG. 6 shows hamming distances of all time shifts of two fingerprints as can be used with embodiments of the present invention.

For each pair of fingerprinting units, the service keeps track of the minimal result of the matching similarity or dissimilarity algorithm, e.g. the minimal hamming distance found over all time shifts and the time shift at which this minimal value was found, and this match value. In FIG. 6, an example is shown of the hamming distances of all time shifts of two fingerprints.

4) The number of values to be matched can be restricted so as to speed up the process. For example, values higher than a given threshold, for instance 75 out of a maximum of 100, are regarded as matching fingerprints. Pairs of units that have matching fingerprints are tracked by the service as potential pairs. For each potential pair, the service tracks the match values and the time shift in accumulators, in order to be able check the consistency of the data over time. The pairs of fingerprinting units that show no potential are discarded.

5) In a second step, the service evaluates the group of potential pairs as follows:

The service checks the group of potential pairs for ambiguities among the series of fingerprints: if units A and B are a potential pair, and also units B and C, but A and C are not a potential pair, then A, B, and C are possibly talking to one another, but no decision can be taken yet.

The service checks the group of potential pairs for consistency among the series of fingerprints: each potential pair has accumulators that keep track of the mean values and the variance of match values and time shifts. If an accumulators show a variance that exceeds a certain threshold, it are regarded as inconsistent and a positive match cannot be made. The thresholds can be chosen heuristically.

Figure 5:
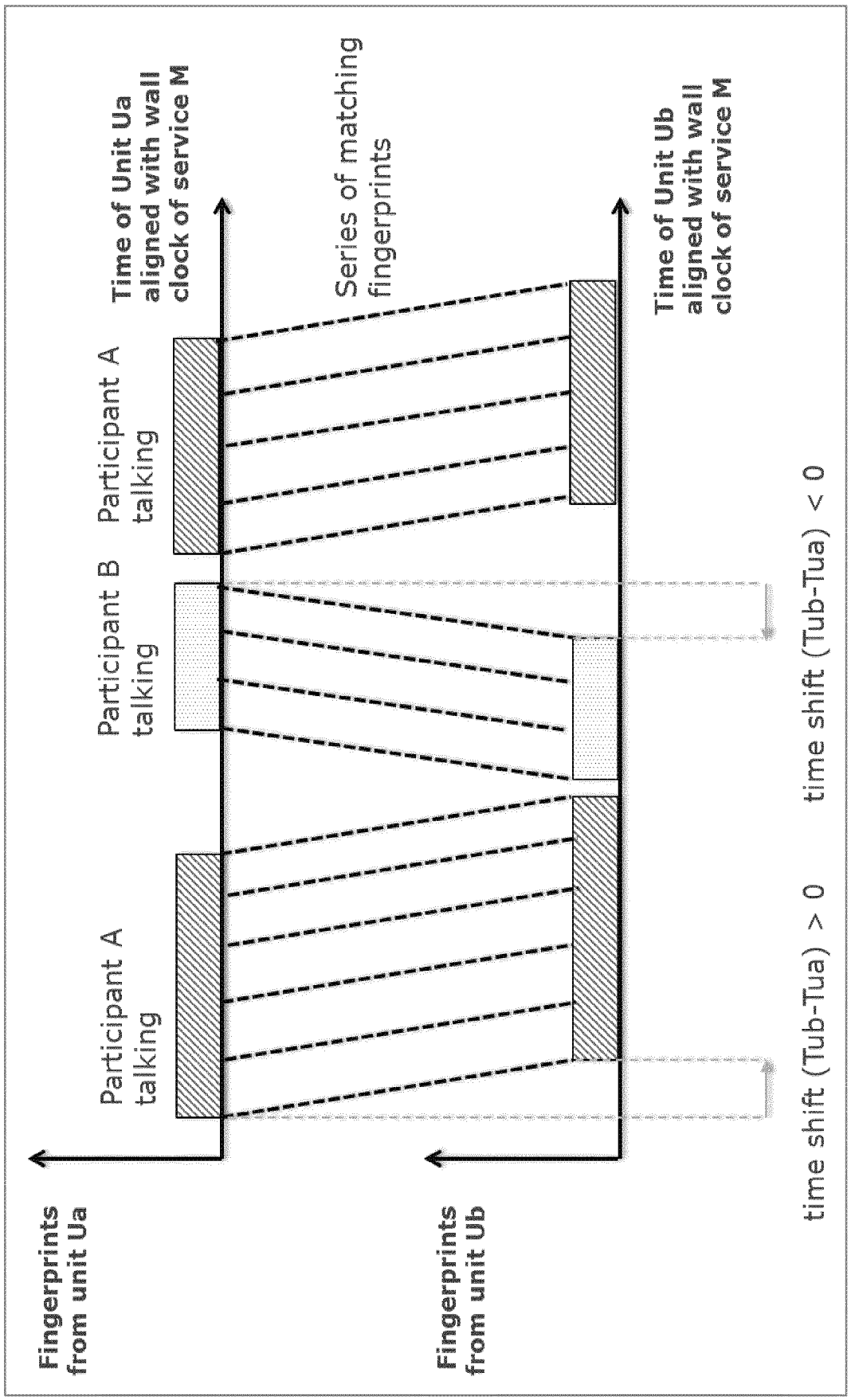
FIG. 5 is a message flow showing latencies in a network for us in embodiments of the present invention.

The service can evaluate the timings of the series of matching fingerprints of the potential pairs. As outlined above, the time shift of matching fingerprints is the amount of time the fingerprints needed to be moved in time, relative to the service clock, to match up. If the fingerprint of a specific unit appears to happen before all other units, than the service can regard that participant as the one who was talking at that time—see FIG. 5. As such, the service can distinguish active participants from silent ones. The service then notifies the participants of the conversation that such an anomaly is detected, by sending a message back to the fingerprinting units. The service checks whether the time shifts show a consistent mirrored image such as is shown in FIG. 5: the time shifts of the series of matching fingerprints jump back and forth between positive and negative time shifts: for instance: +100 ms, −80 ms, +95 ms, . . . .

When the fingerprints of a pair of fingerprinting units have scored a number of matching fingerprints, preferably 6 or more, and the average match value is sufficiently high, for instance higher than 80 or 85 out of 100, and there are no inconsistencies or ambiguities flagged, and the time shifts show a mirrored image, than the service regards these fingerprinting units as being paired and flags this as a positive match.

6) In a third step, the service checks the group of paired units for permutations. In case of a multi-user phone conference, the matching service detects this as a group of pairwise permutations. For instance in case of 4 participants (A, B, C and D) the matching service detects 6 positive matches: AB, AC, AD, BC, BD and CD.

7) Each message with fingerprints, sent by the fingerprinting units, generates a response message from the matching service M. The matching service responds whether the fingerprinting unit is paired or not. Optionally some progress information can be included in the response message, or information on detected anomalies.

Fingerprinting Unit

A fingerprinting unit may be implemented in various forms such as an app on an iPhone or other processing devices such as a laptop or a tablet or can be implemented in a separate unit. This unit, for example, can execute a logic circuit or execute software using a processing engine such as a microprocessor or a programmable logic device (PLD's) such as a PLA (programmable logic array), PAL (programmable array logic), FPGA (field programmable gate array).

Figure 19:
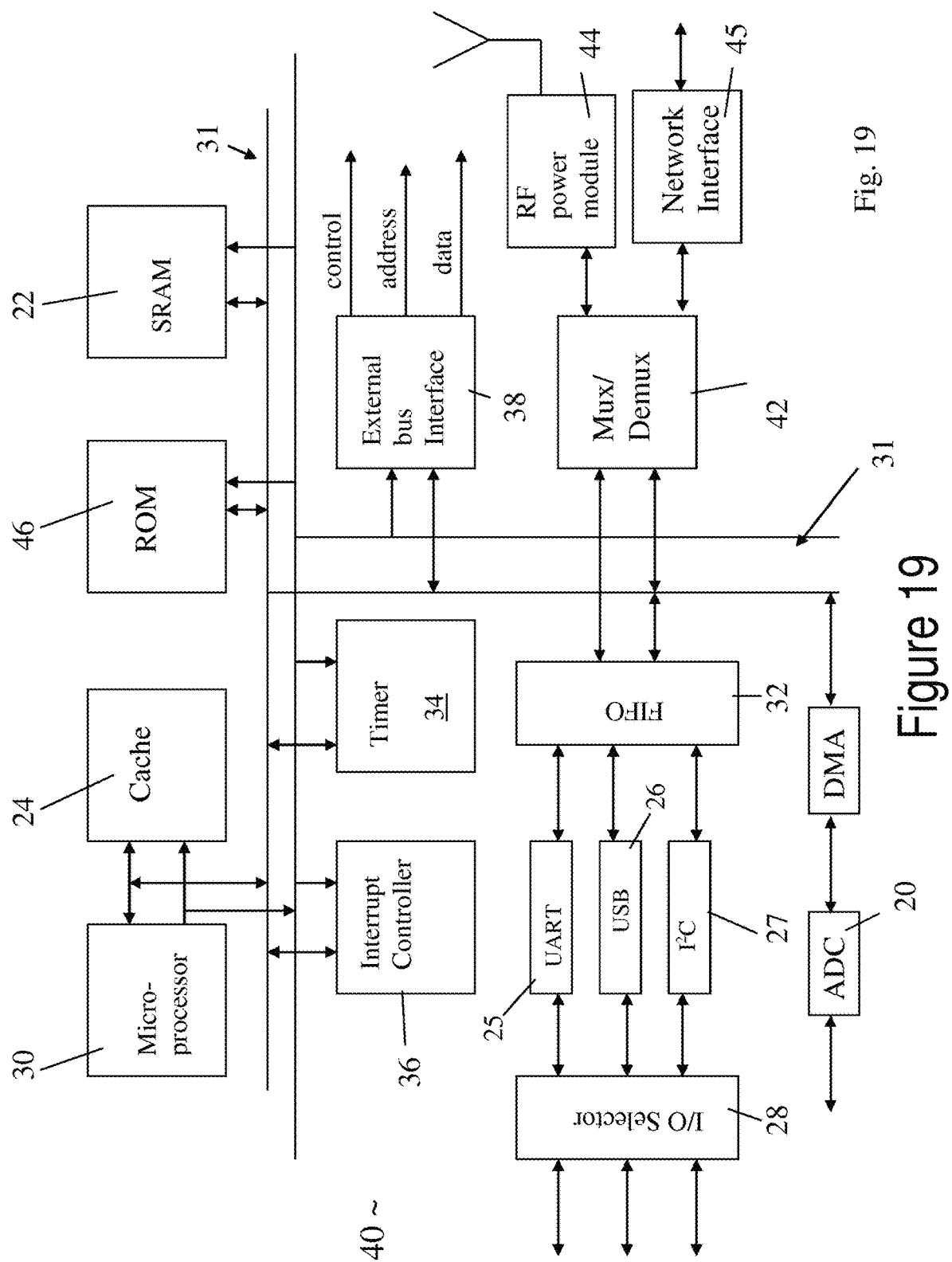
FIG. 19 is a fingerprinting unit in accordance with a further embodiment of the present invention.

An example of such a fingerprinting unit 40 will be described with reference to FIG. 19 providing both wireless and cable network connections. The circuit can include any of a receiver/transmitter for a radio telephone and/or a cable network connection as well as GPS locator circuit. Circuit 40 may include an on-chip Digital Signal Processor (DSP), Codec, Mono Class-D amplifier, USB, UART, and I²C interfaces e.g. for receiving a user action, high performance ADC's, a range of digital input channels and analog input audio channel in a single-chip package. The circuit can be embedded for voice communication. Different audio sampling rates can be provided such as 8 kHz or higher. The circuit 40 may be constructed as a VLSI chip around an embedded microprocessor 30 which may be synthesized onto a single chip with the other components shown.

A zero wait state SRAM memory 22 may be provided on-chip as well as a cache memory 24. Various I/O (input/output) interfaces 25, 26, 27 may be provided, e.g. UART, USB, I²C bus interface as well as an I/O selector 28. FIFO buffers 32 may be used to decouple the processor 30 from data transfer through these interfaces. An audio input, DAC 20 and DMA 21 is provided for receiving the voice audio signals. A counter/timer block 34 may be provided as well as an interrupt controller 36. Baseband data received by block 42 is passed to the processor 30 for processing. Software programs may be stored in an internal ROM (read only memory) 46. Access to an external memory may be provided an external bus interface 38 with address, data and control busses. The various blocks of circuit 40 are linked by suitable busses 31.

The interface to the network interface 45 radio frequency part is provided by block 42 which can handle the multiplexing and demultiplexing of multi-user baseband data frames as well as transmitting to and receiving from the radio frequency power module 44. Alternatively or additionally the data may be output and input through the network interface 45, for example a 10/100 Mbps connection such as an Ethernet connection through an RJ45 connector can be provided.

The radio frequency part can provide USIM/SIM connection and can be adapted to support a variety of frequency bands such as FDMA: GSM/GPRS/EDGE: 850/900/1800/1900 MHz, CDMA: UMTS/HSDPA/HSUPA/HSPA+: 800-850/900/1900/2100 MHz and AWS band (1700/2100 MHz) (B1, B2, B4, B5, B6, B8), CDMA 1×RTT/EV-DO rev0/EV-DO rev A: 800/1900 MHz (BC0, BC1), providing connection speeds like HSPA+: 14.4 Mbps (Cat 10) down, 5.76 (Cat 6) up, EV-DO RevA mode: 3.1 Mbps FL/1.8 Mbps RL, HSPA+ Rd 7 SW features CPC (DTX/DRX), Enhanced L2, EF-DPCH. GPS location can be provided including wideband GPS processing (20 MHz) for improved measurement accuracy. The wireless connectivity provides access to the matching service independent of cable connections, e.g. from a car or mobile office.

The fingerprinting algorithms of the present invention may be implemented as software to run on processor 30, e.g. as an app to run on an iPhone. The software includes code which when executed on processor 30 provides a means for fingerprinting ad hoc real time audio signals of at least two users of a network supporting human voice audio signals. The software includes code which when executed on processor 30 provides a means for transmitting the fingerprints in the direction of a network based matching service. The software includes code which when executed on processor 30 provides a means for receiving an indication of a match. The software includes code which when executed on processor 30 provides a means for receiving a user action for authorising a data transfer. Further details of software are given below.

The fingerprinting algorithms described above and below may be written as computer programs in a suitable computer language such as C and then compiled for the specific processor in the embedded design. Any of the software described below may be stored on a non-transitory signal storage medium such as an optical disc, e.g. a CD-ROM or DVD-ROM, or a magnetic tape, or a magnetic hrd disc, or a solid state memory, Read only Memory or such like.

The Software of a Matching Process

The present invention includes software such as a computer program product which when executed on a processing engine such as a microprocessor or FPGA performs a matching process which can be used with any of the embodiments of the present invention. The letters and numbers refer to components on the drawings and notations starting with [S] refer to steps in the flowchart of FIG. 16:

1) [SU1] The computer program product may include software code segments which when executed on a processing engine allow automatic activation of a fingerprinting function when an outgoing or incoming call is made [SU2]. The software may be adapted to register itself as a software service that is automatically activated by the operating system of the phone (Pa,Pb), when an incoming or outgoing call (1) is made.

2) [SU3] The software may be adapted to set up or allows other network elements to set up a secure connection to an identity provider. This can be a service that is part of the same single-sign-on mechanism in a corporate network, or it can be a trusted third party on the internet, such as services provided by companies like Google or Microsoft.

3) [SU4] The software may be adapted to request from the identity provider one or more access tokens, on behalf of the user (A, B) using for instance a single-sign-on mechanism. The access token can be any suitable access token, for instance an open ID connect access token, or a SAML access token, that is supported by the sharing applications (Sa, Sb). The access tokens serve to grant access on behalf of the user to networked resources on the devices of the user and/or on sharing services (T) on a computer network or the internet. The access tokens preferably contain an access scope, which limits the grant of access to certain usage scenarios, for instance including scenarios to connect and communicate with networked devices, but excluding scenarios to access any electronic content. The access tokens may optionally contain the public IP address of fingerprinting unit, allowing other units to connect to it. And the access tokens preferably also contain an expiration time, which limits the grant of access in time.

4) [SI1] The software may be adapted to receive the requested access token(s) [SI2] [SI3].

5) [SU5] The software may be adapted to create an identification message (Ia, Ib). The identification message may be as defined in DefL above. The identification message (Ia,Ib) preferably contain information on the identity of the participant, such as the name, with optionally a picture or an avatar, that can be used in user interfaces. Also, the identification message preferably contains the requested access token(s) from the identity provider.

6) [SU6] The software may be adapted to set up or allow other network elements to set up a secure connection (for example 7a, 7b of FIG. 2, or 5a, 5b of FIG. 3) to a central matching service (M) on the computer network (N).

7) [SU7] The software may be adapted to send the identification message to the matching service (M).

8) Optionally, a VPN anonymizing proxy (P FIG. 3) is used, that sits in front of the matching service (M) and connected thereto via connection (6). In such a case the software may be adapted to make a connection (5a and 5b) to the proxy (P). The software may be adapted to set up such connections (5a, 5b, 6, 7a, 7b) using conventional authentication and encryption protocols. This setup phase is further described in the section "The setup of secure and anonymizing tunnels".

9) [SU8] The software may be adapted to sample the audio signal from respective inputs (4a and 4b) and preferably create continuous streams of audio fingerprints. A preferred method used to create the fingerprints is further described in the section: "The fingerprinting algorithm". The software may be adapted to make a unique digest of the original audio signal is made, e.g. by application of a one-way function such as a hash.

10) [SU9] The software may be adapted to send the fingerprints, preferably, in small batches (for instance one message per second) to the matching service (M).

11) [SM5] When the matching service (M) detects a positive match, it can exchange the identification messages (Ia, Ib), such that the software is adapted to receive the identification messages of all the other participants [SM7].

12) [SM6] In case no positive match can be made with the fingerprints of a specific unit, the matching service can send feedback on the progress of the matching process for that unit. Also, the matching service can return information on detected anomalies, such as the detection of a silent participant, which can be a potential eavesdropper. [SU12] The software may be adapted to display information to the participant of the progress and any detected anomalies.

13) [SM8] The matching service (M) can generate a session key, preferably a secret session key of which a random session key is one example, by using the fingerprints of one or more participants as seeds for a suitable encryption routine such as a pseudo-random number or alphanumeric message generator. This can be done safely because the fingerprints are unique and contain lots of entropy and this leads to a highly unpredictable, random key. The matching service (M) adds copies of this key, as a shared secret, to the identification messages (Ia, Ib). This key can be used by the sharing applications (Sa, Sb) as a pre-shared secret to start off conventional cryptographic key-exchange protocols to set up additional secure communication channels for the sharing of electronic data.

14) [SM9] The software may be adapted to receive from the matching service (M) the identification messages (Ia, Ib) of the correspondents. The software may be adapted to receive the identification (Ia Ib) messages of all other participants, and the same secret key.

15) [SU13] The software may be adapted to keep track of the identification messages (Ia, Ib) of all correspondents of the phone call or phone conference.

16) [SU14] The software may be adapted to display to the user (A, B) when a positive match has been amde, preferably using the name(s) of the correspondent(s) and the picture(s) or avatar(s) present in the identification message(s) and by using a visual message, or by a tactile signal, an audible signal or any combination of these.

17) [SP5] When the participants hang up the phone, or disconnect the voice communication, the software may be adapted to disconnect connections to the matching service [SU11]. The sharing process can still continue to run, depending on the specific embodiments.

The Software for a Sharing Process, with Embedded Sharing Functionality

The software may be adapted to provide a sharing process, in which a sharing functionality (Sa, Sb) can be embedded in the fingerprint units (Ua,Ub). This process starts off where the matching process workflow, described in the previous section, has stopped. This process can be used with any of the embodiments of the present invention. The letters and numbers refer to components on the drawings (FIG. 1) and notations starting with [5] refer to steps in the flowchart of FIG. 17:

1) [SU15] The participants have now been informed by the software that a positive match has been made. Any participant (A, B, . . . ) can now choose to share electronic content with a simple push of a button, and without any additional login procedure. The software may be adapted to present a participant with a list of possible sharing functionalities. The content of this list depends of what is installed and configured. By choosing to share content, the participant implicitly, but clearly and transparently authenticates the identity of the correspondent(s) he hears on the phone. The following steps, the message flow and the used protocols are dependent of the specific sharing functionality. In this specific sharing process, a sharing functionality is embedded in the fingerprinting unit, and there is no other sharing application involved.

2) [SU16] The software may be adapted to find the public IP address of any of the fingerprinting units (Ub) in an identification message (Ib) and to make a peer-to-peer connection with the relevant fingerprinting unit Ub. (FIG. 1, connection 13). The fingerprint units of the participants are able to find each other in an ad hoc situation, without the help of a user database with registered users and their permissions. Even if none of participants have ever met each other, and even if they all use different access control systems with incompatible security mechanisms, they can still find each other because they start off from a very common user database, a simple phone book. And after the voice communication and/or the data exchange has been completed all connections, permissions, privileges and registered users can be torn down again leaving no rights or privileges outstanding.

3) [SU17] The software of unit (Ua) is adapted to send a message to the unit Ub asking whether the user is willing to accept the electronic content from user A.

4) [SU18] The unit (Ub) receives the sharing request and the software may be adapted to presens it to the participant B.

5) [SU19] Participant B accepts the sharing request and the software of the unit Ub may be adapted to send the response back to unit Ua.

6) [SU20] The software of the unit Ua informs the user A of the acceptance of user B and sends over the electronic content [SU21], which is then presented to user B. [SU22].

The Software of a Workflow of a Sharing Process, Using a Sharing Service (T)

The following section describes the preferred steps of a sharing process, in which a sharing software (Sa, Sb) is embodied in separate sharing applications (Sa, Sb), which are in this example installed on separate devices, with no direct communication with the fingerprint units (Ua,Ub). This example illustrates how it's possible to extend a strong pairing bond as described above between the fingerprinting unit and the participant to other sharing applications, even when these are installed on other devices or computers. This process starts off where the matching process, described above, has stopped. This process can be used with any of the embodiments of the present invention. The letters and numbers refer to components on the drawings (FIG. 4) and notations starting with [5] refer to steps in the flowchart of FIG. 18:

1) [SU14] The software has informed the participants (A, B, . . . ) that a positive match has been made and the software may be adapted to present the users with for instance a list with possible sharing options [SU15].

2) [SU15] In this sharing process example, the participant (A) instructs the software running on his unit (Ua) to connect to a sharing service (T) by choosing for instance an item in a list. This sharing service can be hosted on the internet, on a corporate network or inside a de-militarized zone. In such a case that the sharing services are provided by a webserver, the URL of this webserver providing the services is configured during installation of the fingerprinting units. See FIG. 4.

3) [SU23] The software of the fingerprinting unit (Ua) preferably setups secure connections (10a, 10b) to the sharing service (T).

4) [SU24] The software of the fingerprinting unit (Ua) sends the identification messages of preferably all participants to the sharing service (T).

5) [ST1] The sharing service (T) software is adapted to create preferably for each new sharing group a share point, i.e. a structure where all shared data and metadata is assembled. [ST2]

6) [SS1] The participants (A, B, . . . ) start the execution of their sharing applications (Sa, Sb, . . . ) software.

7) [SS2] The participants login to their applications (Sa, Sb, . . . ) in a conventional way. This can be done automatically using for instance a single-sign-on mechanism.

8) [SS3] Upon startup execution of the sharing applications software, the application software preferably sets up a secure communication (9a, 9b, . . . ) with a sharing service (T).

9) [SS4] The sharing application software preferably sends a registration message to the sharing service.
10) [ST3] The sharing service software is adapted to look up any existing share point for the registered user. In case such a share point exists, the sharing service software is adapted to return the identification message(s) assembled in the share point. [ST4]
11) [SS5] The sharing application software informs the user (A, B, . . . ) of the sharing options with the corresponding participants, preferably using the name(s) of the correspondents and optionally a picture or an avatar, which can be present in the identification messages (Ia, Ib).
12) [SS6] From this point onwards, any participant (A, B, . . . ) can now choose to share electronic content with a simple push of a button, and without any additional login procedure. The sharing application (Sa, Sb, . . . ) software can for example present the user with a list of supported sharing functionalities, and can request whether the user wants to share content with the listed participants. Again, by choosing to share content, the user (A) implicitly authenticates the identity of the correspondent(s) (B, . . . ) which he hears on the phone (Pb, . . . ) and this reinforces the weak paring bond that existed between that participant (B, . . . ) and the application (Sb, . . . ) that acts on its behalf.
13) [SS7] When for instance the user A decides to share content, the sharing application (Sa) software sends the selected content to the sharing service (T), where it is added to the share point [ST5, ST6]. The sharing service software then sends for instance a sharing request message to units of other participants (B, . . . ) [ST7].
14) [SS8] The software of unit (Ub, . . . ) is adapted to receives the sharing request and present it to the participant B.
15) [SS9] When participant B accepts the sharing request, the sharing application (Sb) software sends an acceptance message back to sharing service (T).
16) [ST5] The sharing service (T) software looks up the share point and returns the shared content to sharing application Sb [ST8] software.
17) The sharing service software informs the user A of the acceptance of user B. (not shown in flowchart.)
18) [SS11] The sharing application software then presents the shared content to user B.
19) Again, when the voice communication and/or the data exchange have been completed all connections, permissions, privileges and registered users can be torn down leaving no rights or privileges outstanding.

The Software for the Setup of Secure and Anonymizing Tunnels

The section outlines in detail how the connections are setup with the optional anonymizing proxy (P FIG. 4) and how the messages flow in case the matching service makes a positive match.

In some applications, it can be suitable to use one or more anonymizing proxies (P) that hide the public IP addresses of the fingerprinting units. This is suitable in applications where neither the matching service (M) nor the proxy (P) can be allowed to figure out, who is calling with whom, for instance, in case the matching service (M) is deployed on the internet and accepts connections from the general public—see FIG. 3.

1) At startup, the proxy (P) software sets up a secure connection (6 FIG. 3) with the matching service (M). This can be done preferably using a secure protocol such as IPsec VPN protocols (tunnel mode) or optionally using SSL/TLS protocols. The proxy (P) software verifies the identity of the service (M) by using a cryptographic mechanism such as an asymmetrical system such as use of the Public Key Infrastructure (PKI, not shown on drawing) or a symmetrical system such as by using a pre-shared secret or by any trusted certificate authority system—see FIG. 7.
2) Referring to FIG. 7, upon activation of a fingerprinting unit, the software of this unit (Ua, Ub) preferably sets up a secure connection (5a, 5b) with the anonymizing proxy (P). This can be done preferably using IPsec VPN protocols (tunnel mode) or optionally using SSL/TLS protocols. The software of unit (Ua, Ub) is adapted to verify the identity of the proxy (P) by using a suitable encryption system such as an asymmetrical system like the Public Key Infrastructure (PKI, not shown on drawing) or a symmetrical system by using a pre-shared secret or any trusted certificate authority system. A pre-shared secret is generally more vulnerable but doesn't require a trusted certificate authority. A pre-shared secret can be distributed to the fingerprinting units during installation phase or during regular software upgrades—see FIG. 7. The proxy software can be adapted to forward and anonymize the messages of the fingerprinting units for the matching service. And the software of the proxy also returns the responses from the matching service (M) back to the relevant fingerprinting unit.
3) The software of the one or more fingerprinting units (Ua, Ub) preferably setup an additional encrypted communication channel or tunnel (Tunnel 11 and 12 of FIG. 8) with the matching service (M) on top of the VPN tunnel connections (5a and 6, 5b and 6, respectively). The messages sent through this tunnel (11 and 12 of FIG. 8) are preferably not readable by the proxy (P). Preferably, the software of the proxy (P) is adapted to just forward the messages as before, but their payload is encrypted and is only readable by the matching service.
4) The software of the fingerprinting Units (Ua, Ub) is adapted to carry out an appropriate cryptographic procedure such as generating an encryption key such as a random encryption key (Ka, Kb) and use this key to encrypt an identification message (Ia, Ib). This message contains metadata such as a public IP address, and/or the name of the participant (A, B) or other data such as a GPS location. The software of the fingerprinting unit is adapted to send this message through the encryption tunnel 11, 12) to the matching service—see FIG. 9.
5) The software of units (Ua, Ub) send the encryption key (Ka, Kb) to the proxy (P)—see FIG. 10.
6) The software of proxy (P) continues with the appropriate cryptographic procedure such as encrypting this key with its own key (Kp) and then sending the encrypted key (Ka,Kb) to the matching service (M). Preferably, the software of proxy (P) uses the same key (Kp) for all fingerprinting units. The software of proxy sends this key (Kp) as a response to the fingerprinting units (Ua, Ub)—see FIG. 11. The software of the fingerprinting units will need this key later in the process. The software of proxy (P) preferably changes this key at regular intervals, for instance once every day. When it is nearly time to change the key, the software of proxy (P) preferably also sends the next key Kp+1 to the fingerprinting units and when the key has recently been changed, the software of the proxy preferably also sends the previous key Kp-1 to the fingerprinting units, otherwise a unit may receive the wrong key.

7) The software of the matching service (M) keeps track of these messages (Ia,Ib). The service (M) software knows which identification message (Ia, Ib) belongs to which fingerprints, but the service software is preferably adapted so that it cannot read or decipher the messages (Ia,Ib) nor, preferably, does it know the IP address of the fingerprinting units. At this stage, the fingerprinting units (Ua, Ub) are ready to send fingerprints to the matching service. When a little later say a few seconds later, the matching service software makes a positive match, the matching service sofw<tare exchanges metadata such as the identification messages (Ia, Ib) and the encrypted keys (Ka, Kb)—see FIG. 12.

Figure 13:
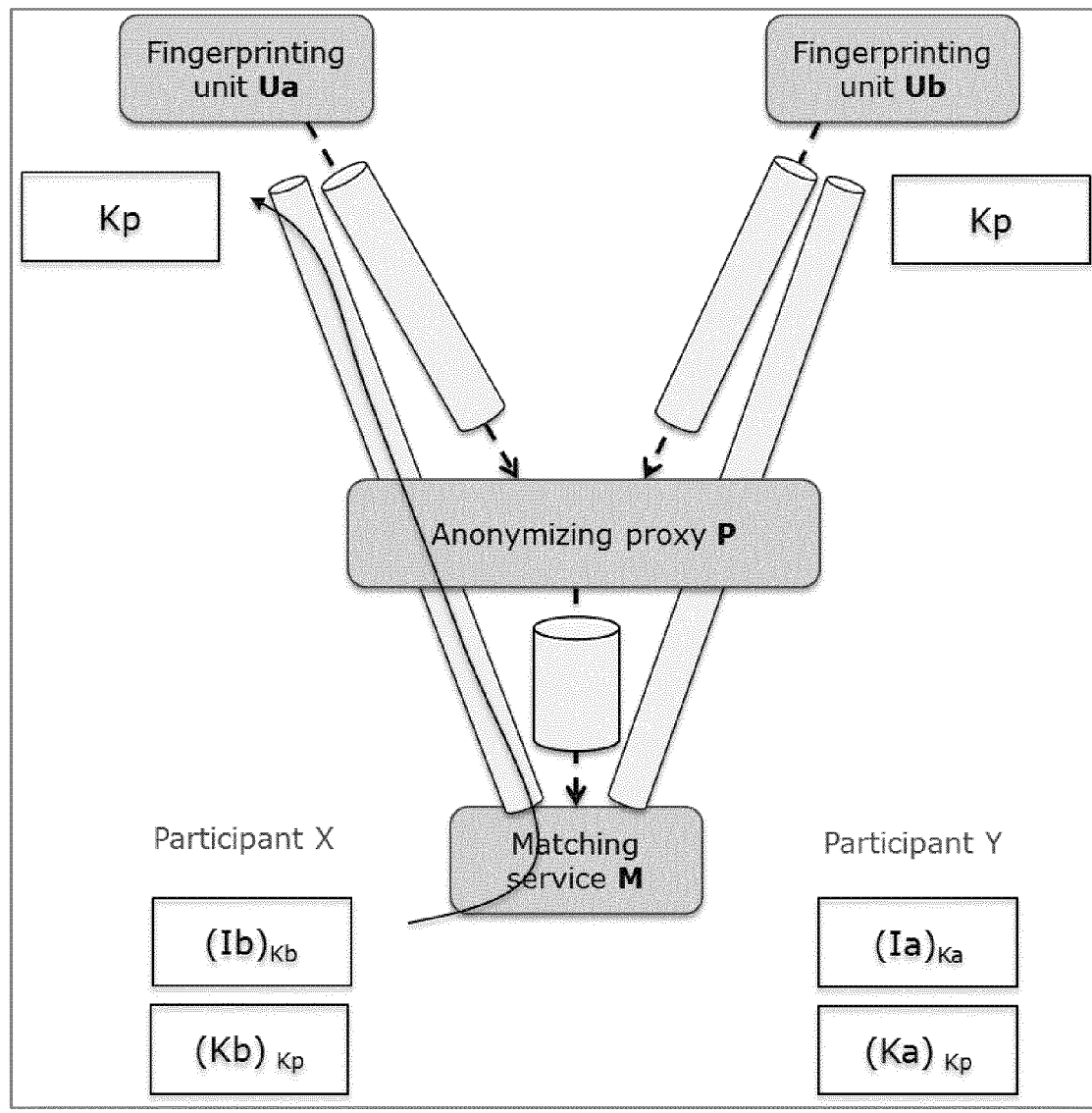

8) For example, the matching service software is adapted to send the ID and the encryption key of the correspondent of participant X to its (relevant) unit Ua through the encryption tunnel (tunnel 11)—see FIG. 13. Since the service M software answers each fingerprint message with a response message, no special arrangements need to be taken, to obfuscate the positive match for the proxy.

Figure 14:
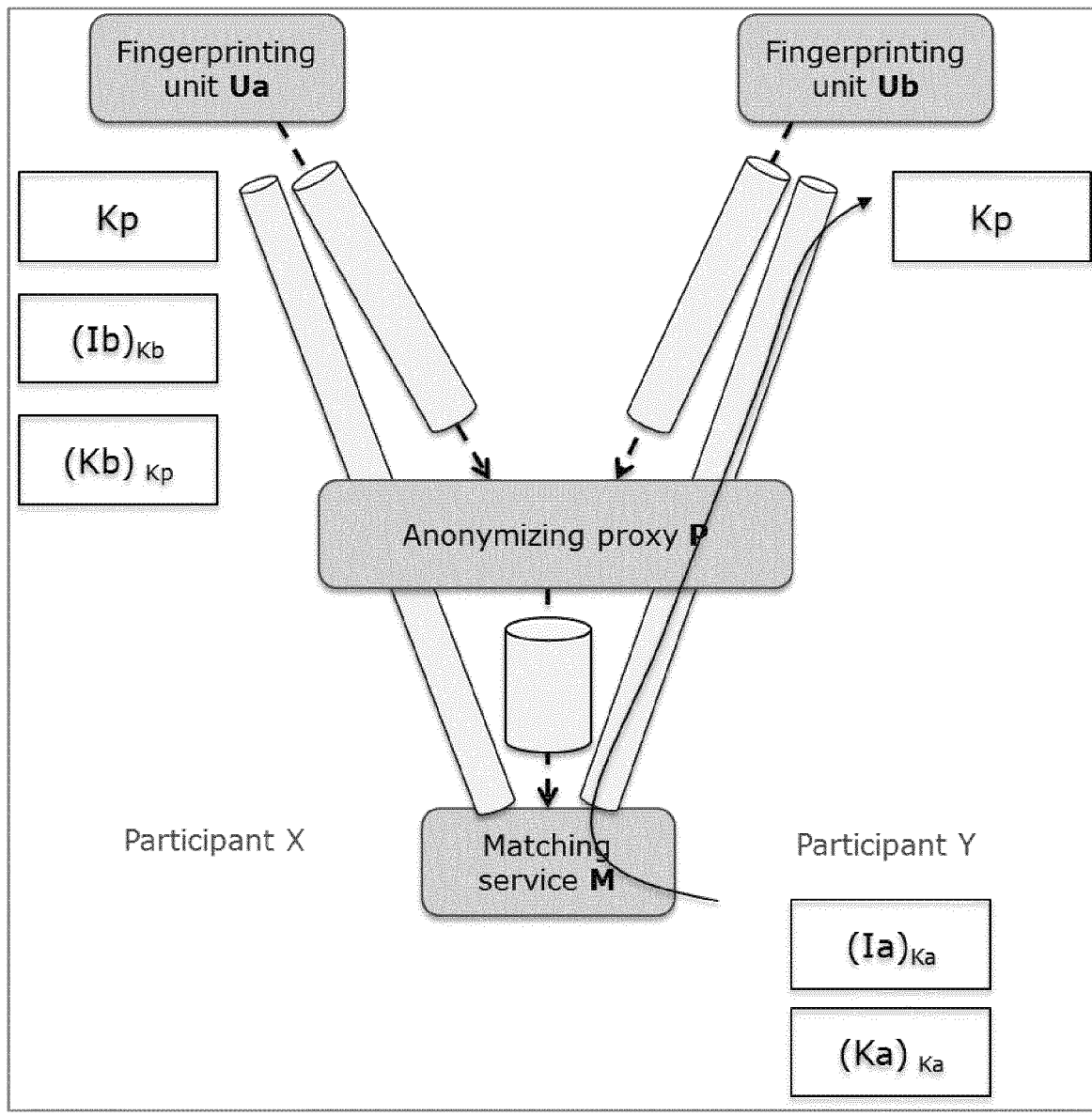

9) The matching service software is adapted to send the ID and the encryption key of the correspondent of participant Y to its unit Ub through the encryption tunnel (tunnel 11)—see FIG. 14.

Figure 15:
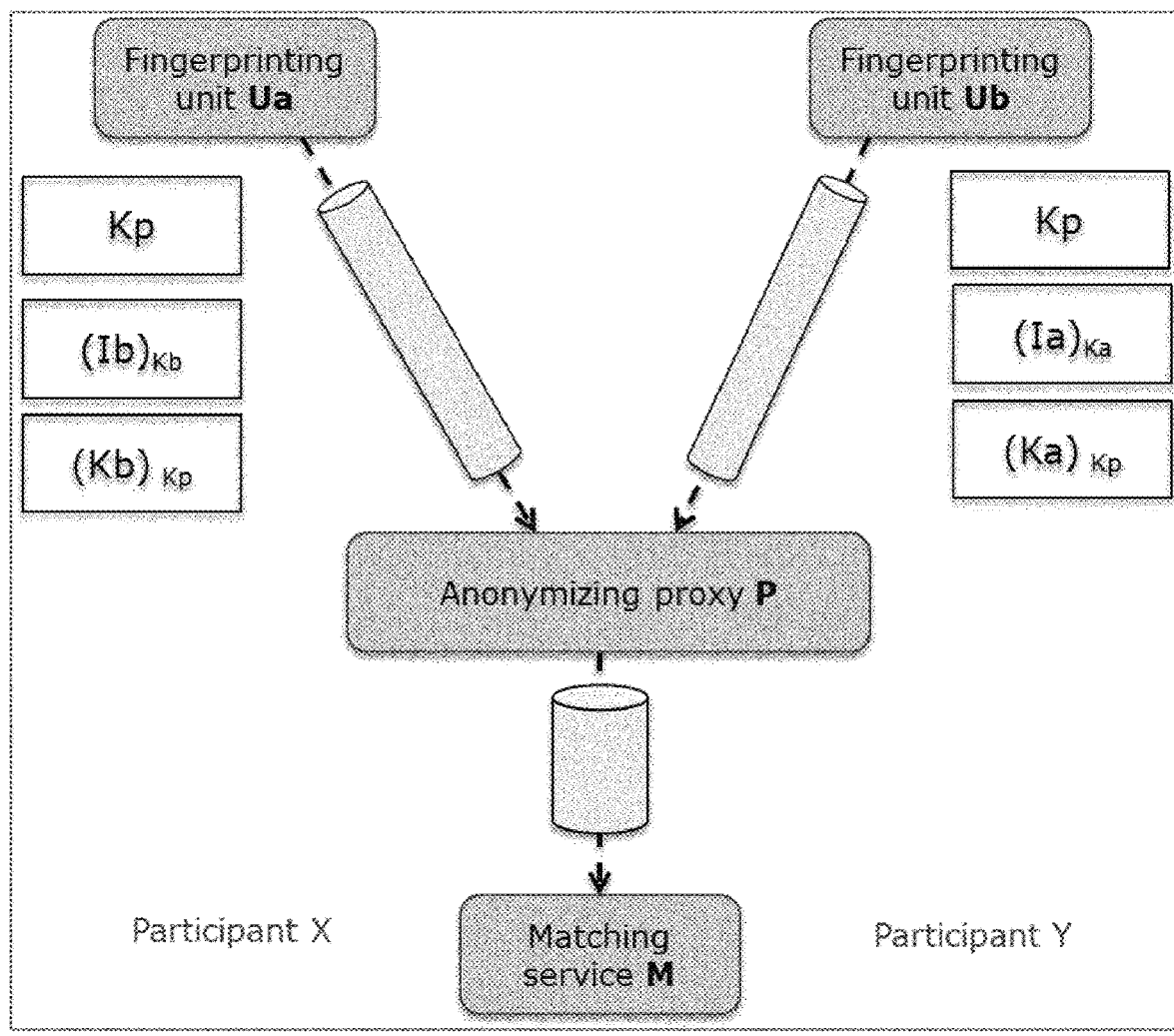

10) In the final step, the softwares of both fingerprinting units (Ua, Ub) have the identification messages (Ib, Ia) of their correspondent, the encryption key (Ka, Kb) of their correspondent and the encryption key (Kp) of the proxy—see FIG. 15. As such, the softwares of the fingerprinting units can decrypt the encryption keys and then decrypt the identification messages themselves.

11) In case no such proxy (P) is used, the software of the fingerprinting units can set up secure connections to the service (M) directly. And the software of the fingerprinting units can send the identification messages to the matching service (M) without any additional encryption. In such case, the service (M) software knows the identity of the users. In some applications the matching service (M) software can also be instructed to verify whether the users have the required level of authorization to use that application or to access the confidential resource. This may be done by querying a user database (D) in which such levels of authorizations per used are stored—see FIG. 2.

12) Note in the above embodiment a specific method flow is described. The present invention is not restricted to this flow. Alternative cryptographic mechanisms can be used and even no cryptographic mechanism needs to be used if the participants believe there is no risk of being compromised.

Software of an Audio Fingerprinting Algorithm

The following section outlines a human voice audio fingerprinting algorithm which can be used with any of the embodiments of the present invention as described above. The fingerprinting algorithm is carried out by software executed on any of the fingerprinting units mentioned above:

1) The human voice audio signal from the phone is sampled by a sampler, e.g. implemented in software in the fingerprinting unit, at a sampling rate, for example at a frequency of 8 KHz. This is considered sufficiently high to capture the human voice but higher or lower rates may be used.

2) The fingerprinting algorithm software can work in frames, whereby each frame comprises a number of human voice audio samples. A frame preferably contains 4096 samples, or is 512 milliseconds long. Shorter frames can also be used. Stereo channels can be treated separately but preferably they are—combined to form a single mono channel. The sampling resolution is preferably 16 bit deep.

3) The fingerprinting is preferably done by the software using two audio buffers in the fingerprinting unit: while the one buffer is being filled with new audio samples, the second one is being fingerprinted, and the result sent to the matching service.

4) The frames are copied by the software into buffers such as circular buffers in the fingerprinting unit. The samples in that frame are filtered by the software with a suitable window function. A window function is also known as an apodization function or tapering function, is a mathematical function that is zero-valued outside of some chosen interval. The window may have a plurality of dimensions. When another function or waveform/data-sequence is multiplied by a window function, the product is zero-valued outside the interval. All that is left is the part where they overlap. The window functions can be non-negative smooth "bell-shaped" curves, rectangles, triangles, or other functions that have a property of producing a limited range or "window" of results. The present invention also allows a more general definition of window functions that does not require them to be identically zero outside an interval, as long as the product of the window multiplied by its argument is square integrable and, more specifically, that the function goes sufficiently rapidly toward zero 5) An example of a window function is a Hanning windowing function or a sliding Hanning windowing function. This windowing function is defined as follows:

$$w(n) = 0.5\left(1 - \cos\left(\frac{2\pi n}{N-1}\right)\right)$$

Where N equals the size of the window and n is the amplitude of the sample.

6) The windowed samples are transformed by software to the frequency domain via any suitable algorithm such as the fast Fourier transformation (FFT) or a wavelet algorithm.

7) The frequency samples are then copied by the software into a number of frequency bins, such as 24 frequency bins. The bandwidth of the frequency bins is preferably smaller for lower frequencies and wider for higher frequencies. Frequencies below 200 Hz and above 2024 Hz can be attenuated or cut off. The cut-off frequencies of the subsequent energy bins are chosen in ay suitable way, e.g. as follows: 200, 240, 283, 329, 378, 430, 485, 544, 606, 671, 739, 810, 884, 962, 1043, 1127, 1214, 1304, 1397, 1494, 1594, 1697, 1803, 1912 and 2024. The number of bins can be increased to for instance to 32 bins to create a more precise fingerprint.

8) The total energy level of each frequency bin (or band) is then determined by the software. For example the energy level of each bin can be calculated by the software as the sum of all magnitudes of the frequency samples. The magnitude of the sample can be calculated by the software for example as the square root of the real component squared plus the imaginary component squared.

9) The following logic can be applied by the software over the plurality of bins, e.g. 24 frequency bins. If $E(b)_t$ is the energy of the frequency bin b at time t and $E(b+1)_{t-1}$ is the energy of band b+1 at time t−1, then the bit b of the fingerprint is 1 if $E(b)_t-E(b+1)_t$ is bigger than $E(b)_{t-1}-E(b+1)_{t-1}$. Otherwise the bit is zero.

10) As such, for each bin sub-print is made for the plurality of bins, e.g. a 24 bit sub print is created for 24 frequency bins.

11) Then the software moves the sliding windowing function forward by a time period, such as 16 milliseconds and a new sub-print is calculated. A complete frame is made up of all the sub-prints, e.g. for a frame of 512 milliseconds there are 32 sub-prints of 24 bits or a single fingerprint of 96 bytes long. Preferably, each sub-print overlaps a great deal in time with the following sub-print.

12) Each fingerprint can be time-stamped by the software of the fingerprinting unit.

13) The fingerprints can be sent by the software to the matching service in small groups, for instance, per 8 fingerprints.

The Software for the Matching Algorithm

The matching service (M) software compares all incoming streams of fingerprints in real-time and attempts to match two or more of them. An algorithm for this matching is carried out by any matching service software mentioned above and can be as follows:

1) The following procedure can be used with any of the embodiments of the present invention. For example, the service (M) software and the software of units (Ua, Ub, . . . ) keep a clock, preferably an accurate clock to generate timestamps. The matching service software and the fingerprinting units software estimate the difference between the clock of service M and the clock in each of the connected fingerprinting units, as follows. Each message with fingerprints is time-stamped by the software as it leaves the fingerprinting unit, and again as it received by the matching service software. In addition, each response back to the fingerprinting units is time-stamped by the software as it leaves the service and as it is received by the fingerprinting unit software. As such, the fingerprinting unit is provided with a processing engine running software able to calculate how much time went by during the transmission and during processing of the last message. The software of the fingerprinting unit can estimate, using the processor, the difference between the service clock and its own unit clock, by assuming the network delay is constant. The fingerprinting unit software is adapted to track this difference and add it to each new fingerprint message. The service M software keeps track of all the differences and uses them to align the fingerprints of all connected fingerprinting units in time.

2) The service M software pushes the fingerprints into buffers especially circular buffers located in system memory of the matching service (M). The buffers only store the fingerprints of the last few seconds. The buffers also keep track of the time of each of fingerprints, according to the service clock.

3) At specific intervals, for instance once every second or half a second, the service software compares the fingerprints of each of the fingerprinting units, with those of each other unit, as follows:

The fingerprints are matched over a fixed period, preferably close to a second, or for example 2 frames of 512 milliseconds.

The fingerprints for different fingerprinting units are compared, e.g. if there are two fingerprinting units the fingerprints are compared two by two, and, by shifting the time relative to one another in small increments, as small as 32 milliseconds, up to a total time shift of one or more seconds. So the fingerprint of unit A, taken at time t1, is compared with fingerprint of unit B taken at t1, and once again at t1 plus 32 ms, and again at t1 plus 64 ms and so. This is needed to compensate for the delay of the telephone network and the delay of the computer network. These delays can re-enforce one another and can be different for the two fingerprints as their paths to the matching service can be different.

For each time shift, a matching similarity or dissimilarity can be determined by the software. For example the hamming distance can be calculated as the number of individual mismatched bits in the total fingerprint.

In addition, the output of the matching similarity or dissimilarity algorithm such as the calculation of the hamming distance can be corrected with a factor expressing how unique the time shift is relative to all other time shifts:

With 'Hamming' being the output of the matching similarity or dissimilarity algorithm, e.g. the hamming distance;

With 'Avg' equaling an average or representative value of the results of the matching similarity or dissimilarity algorithm, e.g. the average of the hamming distance;

With 'S' being the standard deviation;

With 'U' a factor expressing how unique the value hamming distance is.

$U=(\text{Avg}-\text{Hamming})/S$

To reward highly unique values, a correction factor can be calculated as follows:

With 'b' a factor that determines the slope; (ie. 3)

$\text{Correction}=(e^{(u-2)}-e^{(-u+2)})/b$

Where corrections smaller than zero are rejected, the match can be calculated as follows, with 'Length' equaling the total length of the fingerprint in bits:

$\text{Match}=100-(100*(\text{Hamming/Correction}))/\text{Length}$

For each pair of fingerprinting units, the service software keeps track of the minimal result of the matching similarity or dissimilarity algorithm, e.g. the minimal hamming distance found over all time shifts and the time shift at which this minimal value was found, and this match value. In FIG. 6, an example is shown of the hamming distances of all time shifts of two fingerprints.

4) The number of values to be matched can be restricted so as to speed up the process. For example, values higher than a given threshold, for instance 75 out of a maximum of 100, are regarded as matching fingerprints. Pairs of units that have matching fingerprints are tracked by the service as potential pairs. For each potential pair, the service tracks the match values and the time shift in accumulators, in order to be able check the consistency of the data over time. The pairs of fingerprinting units that show no potential are discarded.

5) In a second step, the service software evaluates the group of potential pairs as follows:

The service checks the group of potential pairs for ambiguities among the series of fingerprints: if units A and B are a potential pair, and also units B and C, but A and C are not a potential pair, then A, B, and C are possibly talking to one another, but no decision can be taken yet.

The service checks the group of potential pairs for consistency among the series of fingerprints: each potential pair has accumulators that keep track of the mean values and the variance of match values and time shifts. If an accumulators show a variance that exceeds a certain threshold, it are regarded as inconsistent and a positive match cannot be made. The thresholds can be chosen heuristically.

The service software can evaluate the timings of the series of matching fingerprints of the potential pairs. As outlined above, the time shift of matching fingerprints is the amount of time the fingerprints needed to be moved in time, relative to the service clock, to match up. If the fingerprint of a specific unit appears to happen before all other units, than the service can regard that participant as the one who was talking at that time—see FIG. 5. As such, the service can distinguish active participants from silent ones. The service software then notifies the participants of the conversation that such an anomaly is detected, by sending a message back to the fingerprinting units. The service software checks whether the time shifts show a consistent mirrored image such as is shown in FIG. 5: the time shifts of the series of matching fingerprints jump back and forth between positive and negative time shifts: for instance: +100 ms, −80 ms, +95 ms, . . . .

When the fingerprints of a pair of fingerprinting units have scored a number of matching fingerprints, preferably 6 or more, and the average match value is sufficiently high, for instance higher than 80 or 85 out of 100, and there are no inconsistencies or ambiguities flagged, and the time shifts show a mirrored image, than the service software regards these fingerprinting units as being paired and flags this as a positive match.

6) In a third step, the service software checks the group of paired units for permutations. In case of a multi-user phone conference, the matching service software detects this as a group of pairwise permutations. For instance in case of 4 participants (A, B, C and D) the matching service detects 6 positive matches: AB, AC, AD, BC, BD and CD.

7) Each message with fingerprints, sent by the fingerprinting units software, generates a response message from the matching service M software. The matching service software responds whether the fingerprinting unit is paired or not. Optionally some progress information can be included in the response message, or information on detected anomalies.

First Audio Device Software

Accordingly, the present invention in one aspect provides a computer program product, comprising software code segments which when executed on a processing engine of an audio telecommunication device allows activation of a fingerprinting function when an outgoing or incoming call is made, the software being adapted to set up or allows other network elements to set up a secure connection to an identity provider.

The software allows automatic activation of a fingerprinting function when an outgoing or incoming call is made.

The software may be adapted to register itself as a software service that is automatically activated by the operating system of the telecommunication device when an incoming or outgoing call (is made.

The identity provider can provide a service that is part of the same single-sign-on mechanism in a corporate network, or it can be a trusted third party on the internet, The software may be adapted to request from the identity provider one or more access tokens, on behalf of a user using for instance a single-sign-on mechanism.

The access token can be any suitable access token, for instance an open ID connect access token, or a SAML access token, that is supported by the sharing applications (Sa, Sb).

The access tokens serve to grant access on behalf of the user to networked resources on the devices of the user and/or on sharing services (T) on a computer network or a wide area data network such as the internet.

The access tokens preferably contain an access scope, which limits the grant of access to certain usage scenarios, for instance including scenarios to connect and communicate with networked devices, but excluding scenarios to access any electronic content.

The access tokens may optionally contain the public IP address of a fingerprinting unit, allowing other units to connect to it.

And the access tokens preferably also contain an expiration time, which limits the grant of access in time.

The software of the telecommunications device may be adapted to receive the requested access token(s).

The software may be adapted to create an identification message (Ia, Ib).

The identification message preferably contains information on the identity of the participant, such as the name, with optionally a picture or an avatar, that can be used in user interfaces.

Also, the identification message preferably contains the requested access token(s) from the identity provider.

The software may be adapted to set up or allow other network elements to set up a secure connection to a central matching service on a network.

The software may be adapted to send the identification message to the matching service.

Optionally, a VPN anonymizing proxy is used, that sits in front of the matching service (M) and connected thereto via a connection, the software may be adapted to make a connection to the proxy.

The software may be adapted to set up such connections using conventional authentication and encryption protocols.

The software may be adapted to sample the audio signal from respective inputs and preferably create continuous streams of audio fingerprints.

The software may be adapted to make a unique digest of the original audio signal is made, e.g. by application of a one-way function such as a hash.

The software may be adapted to send the fingerprints, preferably, in small batches to the matching service.

When the matching service (M) detects a positive match, it can exchange the identification messages (Ia, Ib), such that the software is adapted to receive the identification messages of all the other participants [SM7].

Software adapted to receive feedback when no positive match can be made with the fingerprints of a specific unit, the matching service can send feedback on the progress of the matching process for that unit.

Software adapted to receive information on anomalies when the matching service detects anomalies and sends such information, such as the detection of a silent participant, which can be a potential eavesdropper.

The software may be adapted to display information to the participant of the progress and any detected anomalies.

The software may be adapted to receive from the matching service (M) identification messages (Ia, Ib) of the correspondents, The matching service (M) can generate a session key, preferably a secret session key of which a random session key is one example, by using the fingerprints of one or more participants as seeds for a suitable encryption routine such as a pseudo-random number or alphanumeric message generator. This can be done safely because the fingerprints are unique and contain lots of entropy and this leads to a highly unpredictable, random key. The matching service (M) adds copies of this key, as a shared secret, to the identification messages (Ia, Ib). This key can be used by the sharing applications (Sa, Sb) as a pre-shared secret to start off conventional cryptographic key-exchange protocols to set up additional secure communication channels for the sharing of electronic data.

The software may be adapted to receive the identification (Ia Ib) messages of all other participants, and the same secret key.

The software may be adapted to keep track of the identification messages (of all correspondents of the phone call or phone conference.

The software may be adapted to display to the user (A, B) when a positive match has been made, preferably using the name(s) of the correspondent(s) and the picture(s) or avatar(s) present in the identification message(s) and by using a visual message, or by a tactile signal, an audible signal or any combination of these.

When the participants hang up the phone, or disconnect the voice communication, the software may be adapted to disconnect connections to the matching service. The sharing process can still continue to run, depending on the specific embodiments.

Second Fingerprint Phone Software

Accordingly, the present invention in one aspect provides a computer program product, comprising software code segments which when executed on a processing engine of an audio telecommunications device having a first finger print unit provide a sharing process in which sharing functionality is embedded in a fingerprint unit, following a positive match of finger prints from two audio communications having been made, wherein the software is adapted to present a participant with a list of possible sharing functionalities, the audio telecommunications device being adapted provide a choice to share content, whereby the identity of the correspondents audible on the audio telecommunications device are authenticated clearly and transparently.

The software of the first finger print unit may be adapted to find the public IP address of any of second fingerprinting units in an identification message and to make a peer-to-peer connection with one or more second fingerprinting units.

The first and second fingerprint units of the participants are able to find each other in an ad hoc situation, without the help of a user database with registered users and their permissions.

And after the voice communication and/or the data exchange has been completed all connections, permissions, privileges and registered users can be torn down again leaving no rights or privileges outstanding.

The software of the first finger print unit is adapted to send a message to a second fingerprint unit asking whether the second user is willing to accept the electronic content from the first r user.

The second fingerprint unit receives the sharing request and the software may be adapted to present it to the second participant.

The software is adapted to allow the second participant to accept the sharing request and the software of the second fingerprint unit is adapted to send the response back to the first fingerprint unit.

The software of the first fingerprint unit informs the first user of the acceptance of the second user and sends over the electronic content, which is then presented to the second user.

Third Sharing Software

Accordingly, the present invention in one aspect provides a computer program product, comprising software code segments which when executed on a processing engine of a telecommunications device execute a workflow of a sharing process, using a sharing service, wherein a sharing software is embodied in separate sharing applications, installed on separate devices, with no direct communication with fingerprint units. to thereby extend a strong pairing bond between the fingerprinting unit and the participant to other sharing applications, even when these are installed on other devices or computers, The software has informed the participants (A, B, . . . ) that a positive match has been made and the software may be adapted to present the users with for instance a list with possible sharing options.

In this sharing process example, the first participant instructs the software running on the first fingerprint unit to connect to a sharing service, this sharing service can be hosted on the internet, on a corporate network or inside a de-militarized zone.

The software of the first fingerprinting unit sets up secure connections to the sharing service.

The software of the first fingerprinting unit sends identification messages of preferably all participants to the sharing service.

The sharing service software is adapted to create preferably for each new sharing group a share point, i.e. a structure where all shared data and meta-data is assembled.

The participants (A, B, . . . ) start the execution of their sharing applications (Sa, Sb, . . . ) software.

The participants login to their applications (Sa, Sb, . . . ) in a conventional way. This can be done automatically using for instance a single-sign-on mechanism.

Upon startup execution of the sharing applications software, the application software preferably sets up a secure communication (9a, 9b, . . . ) with a sharing service.

The sharing application software preferably sends a registration message to the sharing service.

The sharing service software is adapted to look up any existing share point for the registered user. In case such a share point exists, the sharing service software is adapted to return the identification message(s) assembled in the share point. [ST4]

The sharing application software informs the user (A, B, . . . ) of the sharing options with the corresponding participants, preferably using the name(s) of the correspondents and optionally a picture or an avatar, which can be present in the identification messages (Ia, Ib).

From this point onwards, any participant (A, B, . . . ) can now choose to share electronic content with a simple push of a button, and without any additional login procedure. The sharing application (Sa, Sb, . . . ) software can for example present the user with a list of supported sharing functionalities, and can request whether the user wants to share content with the listed participants. Again, by choosing to share content, the user (A) implicitly authenticates the identity of the correspondent(s) (B, . . . ) which he hears on the phone (Pb, . . . ) and this reinforces the weak paring bond that existed between that participant (B, . . . ) and the application (Sb, . . . ) that acts on its behalf.

When for instance the user A decides to share content, the sharing application (Sa) software sends the selected content to the sharing service (T), where it is added to the share point [ST5, ST6]. The sharing service software then sends for instance a sharing request message to units of other participants (B, . . . ) [ST7].

The software of unit (Ub, . . . ) is adapted to receive the sharing request and present it to the participant B.

When participant B accepts the sharing request, the sharing application (Sb) software sends an acceptance message back to sharing service (T).

The sharing service (T) software looks up the share point and returns the shared content to sharing application Sb [ST8] software.

The sharing service software informs the user A of the acceptance of user B. (not shown in flowchart.)

The sharing application software then presents the shared content to user B.

Again, when the voice communication and/or the data exchange have been completed all connections, permissions, privileges and registered users can be torn down leaving no rights or privileges outstanding.

Fourth Proxy Software

Accordingly, the present invention in one aspect provides a computer program product, comprising software code segments which when executed on a processing engine of a telecommunications device sets up secure and anonymizing tunnels to an anonymizing proxy having a secure connection with an audio fingerprint matching service.

At startup, the proxy (P) software sets up the secure connection (6 FIG. 3) with the matching service (M).

This can be done preferably using a secure protocol such as IPsec VPN protocols (tunnel mode) or optionally using SSL/TLS protocols.

The proxy (P) software verifies the identity of the service (M) by using a cryptographic mechanism such as an asymmetrical system such as use of the Public Key Infrastructure (PKI, not shown on drawing) or a symmetrical system such as by using a pre-shared secret or by any trusted certificate authority system.

Upon activation of a fingerprinting unit, the software of this unit (Ua, Ub) preferably sets up a secure connection (5a, 5b) with the anonymizing proxy (P).

This can be done preferably using IPsec VPN protocols (tunnel mode) or optionally using SSL/TLS protocols.

The software of unit (Ua, Ub) is adapted to verify the identity of the proxy (P) by using a suitable encryption system such as an asymmetrical system like the Public Key Infrastructure (PKI, not shown on drawing) or a symmetrical system by using a pre-shared secret or any trusted certificate authority system.

A pre-shared secret can be distributed to the fingerprinting units during installation phase or during regular software upgrades.

The proxy software can be adapted to forward and anonymize the messages of the fingerprinting units for the matching service.

And the software of the proxy also returns the responses from the matching service (M) back to the relevant fingerprinting unit.

The software of the one or more fingerprinting units (Ua, Ub) preferably setup an additional encrypted communication channel or tunnel with the matching service (M) on top of the VPN tunnel connections.

The messages sent through this tunnel are preferably not readable by the proxy (P).

Preferably, the software of the proxy (P) is adapted to just forward the messages as before, but their payload is encrypted and is only readable by the matching service.

The software of the fingerprinting Units (Ua, Ub) is adapted to carry out an appropriate cryptographic procedure such as generating an encryption key such as a random encryption key (Ka, Kb) and use this key to encrypt an identification message (Ia, Ib).

This message contains metadata such as a public IP address, and/or the name of the participant (A, B) or other data such as a GPS location.

Figure 9:
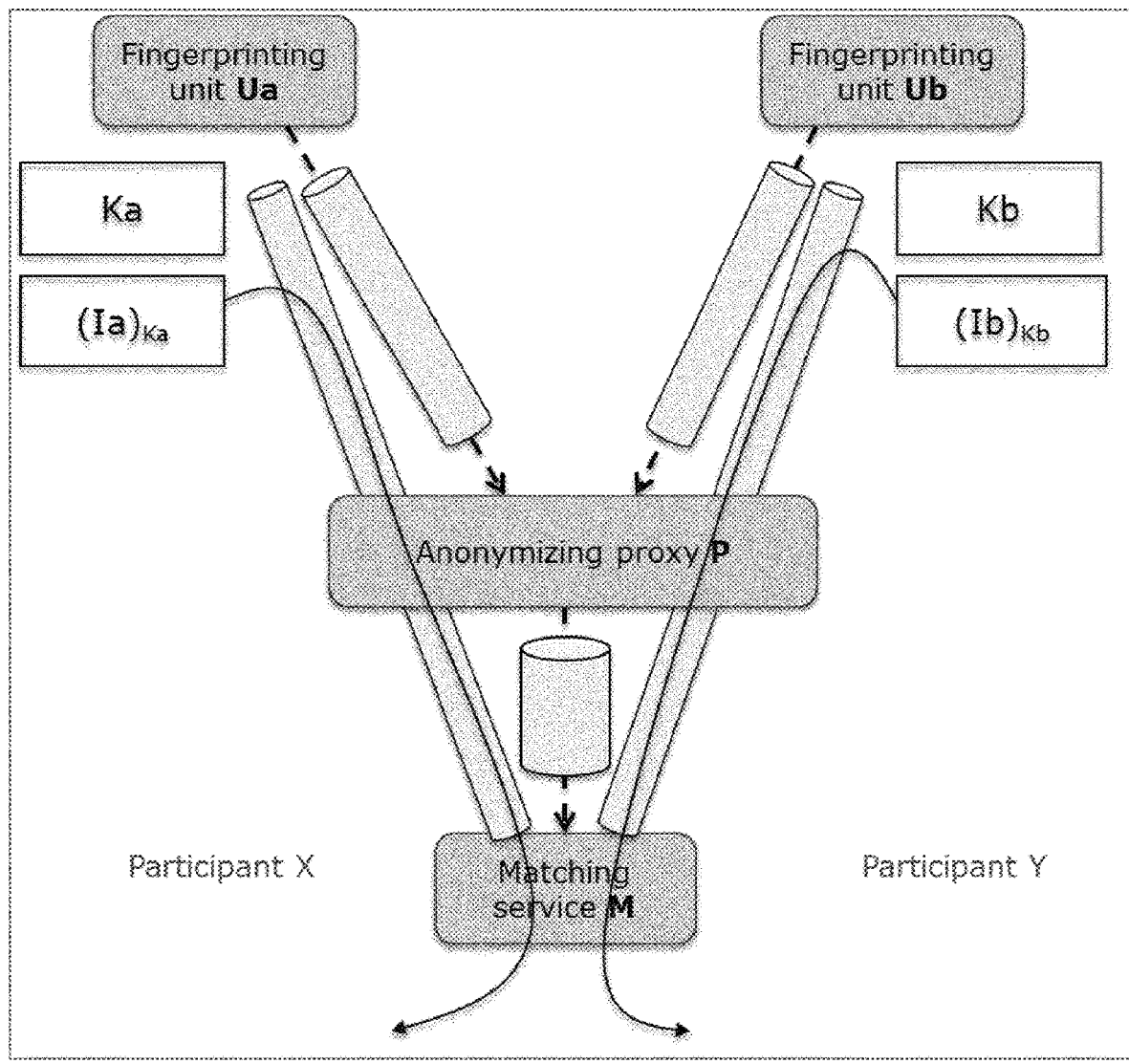

The software of the fingerprinting unit is adapted to send this message through the encryption tunnel (11, 12) to the matching service—see FIG. 9.

The software of units (Ua, Ub) send the encryption key (Ka, Kb) to the proxy (P).

The software of proxy (P) continues with the appropriate cryptographic procedure such as encrypting this key with its own key (Kp) and then sending the encrypted key (Ka,Kb) to the matching service (M).

Preferably, the software of proxy (P) uses the same key (Kp) for all fingerprinting units. The software of proxy sends this key (Kp) as a response to the fingerprinting units (Ua, Ub).

The software of the fingerprinting units will need this key later in the process.

The software of proxy (P) preferably changes this key at regular intervals, for instance once every day.

When it is nearly time to change the key, the software of proxy (P) preferably also sends the next key Kp+1 to the fingerprinting units and when the key has recently been changed, the software of the proxy preferably also sends the previous key Kp−1 to the fingerprinting units, otherwise a unit may receive the wrong key.

The software of the matching service (M) keeps track of these messages (Ia,Ib).

The service (M) software knows which identification message (Ia, Ib) belongs to which fingerprints, but the service software is preferably adapted so that it cannot read or decipher the messages (Ia,Ib) nor, preferably, does it know the IP address of the fingerprinting units.

At this stage, the fingerprinting units (Ua, Ub) are ready to send fingerprints to the matching service.

When a little later say a few seconds later, the matching service software makes a positive match, the matching service software exchanges metadata such as the identification messages (Ia, Ib) and the encrypted keys (Ka, Kb).

The matching service software is adapted to send the ID and the encryption key of the correspondent of participant X to its (relevant) unit Ua through the encryption tunnel.

Since the service M software answers each fingerprint message with a response message, no special arrangements need to be taken, to obfuscate the positive match for the proxy.

The matching service software is adapted to send the ID and the encryption key of the correspondent of participant Y to its unit Ub through the encryption tunnel.

In the final step, the softwares of both fingerprinting units (Ua, Ub) have the identification messages (Ib, Ia) of their correspondent, the encryption key (Ka, Kb) of their correspondent and the encryption key (Kp) of the proxy.

As such, the softwares of the fingerprinting units can decrypt the encryption keys and then decrypt the identification messages themselves.

In case no such proxy (P) is used, the software of the fingerprinting units can set up secure connections to the service (M) directly.

And the software of the fingerprinting units can send the identification messages to the matching service (M) without any additional encryption. In such case, the service (M) software knows the identity of the users.

The matching service (M) software can also be instructed to verify whether the users have the required level of authorization to use that application or to access the confidential resource.

This may be done by querying a user database (D) in which such levels of authorizations per used are stored.

Fifth Fingerprinting Software

Accordingly, the present invention in one aspect provides a computer program product, comprising software code segments which when executed on a processing engine of a telecommunications device execute an audio fingerprinting algorithm; software in a fingerprinting unit being adapted so that a human voice audio signal from the audio telecommunication device is sampled by a sampler, at a sampling rate.

The fingerprinting algorithm software can work in frames, whereby each frame comprises a number of human voice audio samples.

The fingerprinting is preferably done by the software using two audio buffers in the fingerprinting unit: while the one buffer is being filled with new audio samples, the second one is being fingerprinted, and the result sent to the matching service.

The frames are copied by the software into buffers such as circular buffers in the fingerprinting unit.

The samples in that frame are filtered by the software with a suitable window function. A window function is also known as an apodization function or tapering function, is a mathematical function that is zero-valued outside of some chosen interval.

The window may have a plurality of dimensions.

When another function or waveform/data-sequence is multiplied by a window function, the product is zero-valued outside the interval.

The window functions can be non-negative smooth "bell-shaped" curves, rectangles, triangles, or other functions that have a property of producing a limited range or "window" of results.

A window function does not need to be identically zero outside an interval, as long as the product of the window multiplied by its argument is square integrable and, more specifically, that the function goes sufficiently rapidly toward zero.

A window function is a Hanning windowing function or a sliding Hanning windowing function.

This windowing function is defined as follows:

$$w(n) = 0.5\left(1 - \cos\left(\frac{2\pi n}{N-1}\right)\right)$$

Where N equals the size of the window and n is the amplitude of the sample.

The windowed samples are transformed by software to the frequency domain via any suitable algorithm such as the fast Fourier transformation (FFT) or a wavelet algorithm.

The frequency samples are then copied by the software into a number of frequency bins.

The bandwidth of the frequency bins is preferably smaller for lower frequencies and wider for higher frequencies.

The total energy level of each frequency bin (or band) is then determined by the software.

For example the energy level of each bin can be calculated by the software as the sum of all magnitudes of the frequency samples.

The magnitude of the sample can be calculated by the software for example as the square root of the real component squared plus the imaginary component squared.

The following logic can be applied by the software over the plurality of bins, if $E(b)_t$ is the energy of the frequency bin b at time t and $E(b+1)_{t-1}$ is the energy of band b+1 at time t−1, then the bit b of the fingerprint is 1 if $E(b)_t - E(b+1)_t$ is bigger than $E(b)_{t-1} - E(b+1)_{t-1}$, otherwise the bit is zero.

As such, for each bin sub-print is made for the plurality of bins.

Then the software moves the sliding windowing function forward by a time period, and a new sub-print is calculated.

A complete frame is made up of all the sub-prints.

Preferably, each sub-print overlaps a great deal in time with the following sub-print.

Each fingerprint can be time-stamped by the software of the fingerprinting unit.

The fingerprints can be sent by the software to the matching service in small groups, for instance, per 8 fingerprints.

Sixth Matching Software

Accordingly, the present invention in one aspect provides a computer program product, comprising software code segments which when executed on a processing engine of a telecommunication device executes a matching algorithm to match two audio fingerprints from different fingerprint units, the fingerprints of different fingerprinting units are compared to determine time shifts and for each time shift, a matching similarity or dissimilarity is determined by the software.

A matching service software and software of units (Ua, Ub, . . . ) keep a clock, preferably an accurate clock to generate timestamps.

The matching service software and the fingerprinting units software estimate the difference between the clock of the matching service and the clock in each of the connected fingerprinting units.

Each message with fingerprints is time-stamped by the software as it leaves the fingerprinting unit, and again as it received by the matching service software.

In addition, each response back to the fingerprinting units is time-stamped by the software as it leaves the matching service and as it is received by the fingerprinting unit software.

As such, the fingerprinting unit is provided with a processing engine running software able to calculate how much time went by during the transmission and during processing of the last message.

The software of the fingerprinting unit can estimate, using the processor, the difference between the service clock and its own unit clock, by assuming the network delay is constant.

The fingerprinting unit software is adapted to track this difference and add it to each new fingerprint message.

The matching service software keeps track of all the differences and uses them to align the fingerprints of all connected fingerprinting units in time.

The matching service software pushes the fingerprints into buffers especially circular buffers located in system memory of the matching service.

The buffers only store the fingerprints of the last few seconds.

The buffers also keep track of the time of each of fingerprints, according to the matching service clock.

At specific intervals, the matching the service software compares the fingerprints of each of the fingerprinting units, with those of each other unit.

The fingerprints are matched over a fixed period

The fingerprints for different fingerprinting units are compared, e.g. if there are two fingerprinting units the fingerprints are compared two by two.

This can be done by shifting the time relative to one another in small increments up to a total time shift of one or more seconds, to compensate for the delay of the telephone network and the delay of the computer network.

These delays can reinforce one another and can be different for the two fingerprints as their paths to the matching service can be different.

For example the hamming distance can be calculated as the number of individual mismatched bits in the total fingerprint.

In addition, the output of the matching similarity or dissimilarity algorithm such as the calculation of the hamming distance can be corrected with a factor expressing how unique the time shift is relative to all other time shifts With 'Hamming' being the output of the matching similarity or dissimilarity algorithm, e.g. the hamming distance; With 'Avg' equaling an average or representative value of the results of the matching similarity or dissimilarity algorithm, e.g. the average of the hamming distance;

With 'S' being the standard deviation;

With 'U' a factor expressing how unique the value hamming distance is $U=(Avg-Hamming)/S$.

To reward highly unique values, a correction factor can be calculated as follows:

With 'b' a factor that determines the slope; (ie. 3)

$$Correction=(e^{(u-2)}-e^{(-u+2)})/b$$

Where corrections smaller than zero are rejected, the match can be calculated as follows, with 'Length' equaling the total length of the fingerprint in bits:

$$Match=100-(100*(Hamming/Correction))/Length$$

For each pair of fingerprinting units, the service software keeps track of the minimal result of the matching similarity or dissimilarity algorithm, e.g. the minimal hamming distance found over all time shifts and the time shift at which this minimal value was found, and this match value. In FIG. 6, an example is shown of the hamming distances of all time shifts of two fingerprints.

The number of values to be matched can be restricted so as to speed up the process.

Pairs of units that have matching fingerprints are tracked by the service as potential pairs.

For each potential pair, the service tracks the match values and the time shift in accumulators, in order to be able check the consistency of the data over time.

The pairs of fingerprinting units that show no potential are discarded.

In a second step, the service software evaluates the group of potential pairs.

The matching service checks the group of potential pairs for ambiguities among the series of fingerprints The matching service checks the group of potential pairs for consistency among the series of fingerprints: each potential pair has accumulators that keep track of the mean values and the variance of match values and time shifts.

If an accumulator shows a variance that exceeds a certain threshold, it are regarded as inconsistent and a positive match cannot be made. The thresholds can be chosen heuristically.

The service software can evaluate the timings of the series of matching fingerprints of the potential pairs.

The time shift of matching fingerprints is the amount of time the fingerprints needed to be moved in time, relative to the service clock, to match up.

If the fingerprint of a specific unit appears to happen before all other units, than the service can regard that participant as the one who was talking at that time.

As such, the matching service software can distinguish active participants from silent ones.

The matching service software then notifies the participants of the conversation that such an anomaly is detected, by sending a message back to the fingerprinting units.

The service software checks whether the time shifts show a consistent mirrored image.

When the fingerprints of a pair of fingerprinting units have scored a number of matching fingerprints, and the average match value is sufficiently high and there are no inconsistencies or ambiguities flagged, and the time shifts show a mirrored image, than the service software regards these fingerprinting units as being paired and flags this as a positive match.

The matching service software checks the group of paired units for permutations.

In case of a multi-user phone conference, the matching service software detects this as a group of pairwise permutations.

Each message with fingerprints, sent by the fingerprinting units software, generates a response message from the matching service software.

The matching service software responds whether the fingerprinting unit is paired or not.

Optionally some progress information can be included in the response message, or information on detected anomalies. Utility:

1. Sharing a Presentation During a Telephone Conference

A group of people, residing at different locations, want to discuss a subject that requires a reasonable amount of confidentiality. The meeting organizer has an account of a phone conference meeting tool. He sends an email to every member of the group with an invitation for such a conference. The email contains the date and time of the conference, the local phone numbers to use, and a participants' PIN code. This participants' PIN code allows the conference tool to connect the participant to the correct conference. The email message also contains a list of links to install the fingerprinting app for various types of phones. There is also a link to a web page that embeds the fingerprinting functionality as a web application.

At the start of the meeting, the participants activate the fingerprinting units and after a short while (10 to 20 seconds), the units respond with a message that they can start sharing content.

The pairing between the units and their respective participants can now be extended to sharing applications, even when they are installed on other devices. See FIG. 4.

Each participant can now choose to share its content with the group or view shared content from other participants. The sharing application (Sa, Sb) typically enables the participants to see who's connected, and who is sharing his screen or document.

2. Granting Access During Remote Consulting

A radiologist (A) logs into his workstation and starts his medical viewing application. The radiologist examines the images of medical studies and makes diagnoses. For a specific study, he wants to consult a lung specialist (B). He calls his colleague with his smartphone. This is an ad hoc call, for which no prior preparation is done, except that the persons have the fingerprinting unit installed and configured it to use automatic mode. The units (Ua, Ub) are automatically activated by the operating system of the phone, when a call is made. See FIG. 4. When the phone connection is made, the radiologist asks the lung specialist whether he can take a look at the images of the study. His colleague agrees. The radiologist now selects the "share via" menu option of his medical viewing application on his workstation. A list appears with a number of possible ways to share medical studies with. One of the options is an online sharing service (T). The radiologist selects this option. The medical viewing application is connected (10a) to a sharing service (T) and is registered as a sharing application (Sa). The lung specialist starts up his viewing application and also this application connects (10b) with the sharing service (T). At a specific moment, the fingerprinting units receive the message from the matching service that they are paired. The units send the identification messages (Ia,Ib) to the configured sharing services (T). As a result, the sharing applications (Sa, Sb) are now notified that they can start sharing content.

The medical viewing application (Sa) now sends a sharing request message to his correspondent via the sharing service (T). The application (Sb) receives this message and pops up a message to the user B, informing him that a document from radiologist A is ready to be shared and asking him whether he accepts to see this document. The lung specialist accepts the invitation.

What happens next is dependent on the used sharing application. In this particular case, the shared document is not a medical image, but the reference to the study in the database of the hospital of specialist A. The reference is digitally signed by radiologist A and contains an electronic access key. The sharing application (Sb) of the lung specialist B receives this key and uses it to access the specific study. Normally each user that needs to access medical studies must be authenticated via a password or an electronic medical id card. However, in this case, the radiologist A authenticates the lung specialist via the phone call and he grants his colleague an ad hoc access to that specific study. The access right is valid for the study only and only for a short period of time. Although the content of the study is private and confidential, the lung specialist B doesn't need to use a password. He may not even work at that hospital and his identify wouldn't be known by the system of the hospital anyway.

3. Quickly Setup a Video Conference

Setting up a video conference can be cumbersome. Certainly in ad hoc situations, in which people are searching for a free meeting room in the very last minute. People are also increasingly using their own device instead of the standardized, corporate computers (Bring Your Own Device). In such situations, one must figure out the identity of the used devices, and how they can be reached from a remote location. In the case of setting up a video conference, the problem is not so much about trusting the remote system; it is more about speed and ease of use, even in ad hoc situations and for participants that are not used to work with that specific system.

The method described here can also be used to quickly and easily start an ad hoc video conference call by calling each other first via the phone. The phone (nearly) always works, in contrast the video and telephone conferencing systems and tools. By first setting up a phone connection, one can communicate any last minute changes, while setting up the laptops and the presentations. After a number of seconds, the phones are paired via online fingerprinting. Once this ad hoc pairing is done, one can more easily setup the additional video communication channels. (FIG. 4)

After calling each other on the phone, the participants log in the video conference clients as usual. The video conference clients (Sa, Sb) connect to a sharing service (T) and after a few moments the clients get notified and they receive the identification messages (Ib, Ia) via the service T, from the fingerprinting units (Ua, Ub). In this case, the sharing applications use the identification messages to set up a peer-to-peer connection and to send video streams to each other.

4. Sharing Pictures Safely and Easily

Sharing documents during a phone call could also be used by people that just want an easy, safe way. People that want to share pictures, ad hoc, just for day-to-day purposes, during a phone call of grandparent and his or her grandchild, for instance. If the grandchild would like to share a picture he just made, he could use this method to quickly and securely share pictures. This method works, even if the phones are devices that neither of them has used before, and there's no password to enter, and no special method to follow.

5. Switching Over to a More Secure Communication Channel

This method can also be used to switch over from a normal phone connection to a more secure communication channel, or a channel with a better service. Diplomats and corporate manager personnel typically have strict security requirements towards their communications over the phone. In such a use case, participant A calls his correspondent using his mobile phone. This connection over the cellular network is vulnerable. The fingerprinting units on their phones connect to a matching service that is deployed by the organization they work for (See FIG. 2). In this case the sharing application (Sa, Sb) is embodied as a app that also does the fingerprinting. At the moment the two phones are paired, the sharing application (Sa, Sb) on both phones notify the users that a switch to more secure channel is being setup. The sharing application of participant A makes a point-to-point connection over the data-network with the sharing application of participant B. This new data communication uses another encryption technology. The original phone connection is now disconnected. A sound or message notifies the participants that the secure communication is ready and they can now continue the conversation.

The invention claimed is:

1. A method for setting up of multiple data channels in parallel to an existing voice communication, the method comprising:

creating first and second fingerprints of ad hoc real time audio signals exchanged between a first user and a second user during the existing voice communication using a first user equipment and a second user equipment, respectively;

comparing the first and second fingerprints in accordance with a matching algorithm, when the comparing meets a requirement of matching similarity, presenting the first user and/or the second user with possible sharing options;

wherein when one of the possible sharing options is selected, setting up a secure connection to a sharing service, wherein the sharing service creates a share point to set up a secure data connection between the share point and the first user equipment and the second user equipment.

2. The method of claim 1, wherein the sharing option continues after the voice communication is disconnected.

3. The method of claim 1, wherein a sharing application on one of the first or second user equipment is used to create the secure data connection to the sharing service.

4. The method of claim 3, wherein when the first and/or second user shares content, the sharing application sends selected content to the sharing service, where the selected content is added to the share point.

5. The method of claim 3, wherein both the first and second user equipment includes the sharing application, wherein the sharing application of the first user makes a point-to-point connection over the data channel with the sharing application of the second user and the existing voice communication is subsequently disconnected.

6. The method of claim 1, wherein the voice communication is selected from a bi-directional audio communication a phone call, a phone conference or a video conference.

7. The method of claim 1, wherein when the comparing step meets the requirement of matching similarity at least one user is informed thereof by a visual message, or by a tactile signal, an audible signal or any combination of these, or an identification message related to the identities of the users is passed to each user.

8. The method of claim 7, wherein the identification message can be selected from a user id token of the participant of the phone call, and a user id token structure of the participant of the phone call with authorization schemas of access granting protocol(s) and the authorization keys that grant access to networked resources.

9. The method of claim 1, further comprising generating a session key, a secret session key, a random session key, by using a fingerprint of one or more participants as a seed for an encryption routine.

10. The method of claim 1, wherein time shifts that appear in matching pairs of streams of fingerprints due to time lapse to traverse the first and/or second network are detected.

11. The method of claim 10, further comprising tracking the time shifts, to distinguish between silent participants and potential eavesdroppers and the users.

12. The method of claim 1, wherein before the comparing the first and second fingerprints in accordance with a matching algorithm an anonymizing function is applied.

13. The method of claim 1, wherein the first and second fingerprints are determined using a one-way function.

14. The method of claim 1, wherein all connections are torn down after termination of the voice communication or electronic data exchange leaving no surviving rights or permissions.

15. The method of claim 1, wherein the first and second user equipment of first and second users are discovered automatically on the first or second network.

16. The method of claim 1, wherein the comparing step includes matching similarity using metadata.

17. The method of claim 1, wherein creating the first and second fingerprints is activated on receipt of an ingoing or on setting up of an outgoing voice communication.

18. The method of claim 1, wherein the comparing step includes a central matching service.

* * * * *